US012557790B2

(12) United States Patent
Triener

(10) Patent No.: US 12,557,790 B2
(45) Date of Patent: *Feb. 24, 2026

(54) SYSTEMS, METHODS AND COMPUTER PROGRAM PRODUCTS FOR MONITORING THE BEHAVIOR, HEALTH, AND/OR CHARACTERISTICS OF AN ANIMAL

(71) Applicant: SOCIETE DES PRODUITS NESTLE S.A., Vevey (CH)

(72) Inventor: Alexander Triener, San Diego, CA (US)

(73) Assignee: Societe des Produits Nestle S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/731,635

(22) Filed: Jun. 3, 2024

(65) Prior Publication Data

US 2024/0315212 A1    Sep. 26, 2024

Related U.S. Application Data

(63) Continuation of application No. 17/320,921, filed on May 14, 2021, now Pat. No. 12,022,804, which is a
(Continued)

(51) Int. Cl.
*G08B 23/00* (2006.01)
*A01K 1/01* (2006.01)
(Continued)

(52) U.S. Cl.
CPC .......... *A01K 29/005* (2013.01); *A01K 1/0107* (2013.01); *A01K 5/0114* (2013.01);
(Continued)

(58) Field of Classification Search
CPC .. A01K 29/005; A01K 1/0107; A01K 5/0114; A01K 7/00; A01K 31/12;
(Continued)

(56) References Cited

U.S. PATENT DOCUMENTS 4,617,876 A    10/1986 Hayes
5,662,066 A    9/1997 Reitz
(Continued)

FOREIGN PATENT DOCUMENTS

EP    0749685    12/1996
EP    1239268    9/2002
(Continued)

OTHER PUBLICATIONS

International Search Report and Written Opinion to PCT/US2012/39720, dated Oct. 1, 2012.

*Primary Examiner* — Anh V La
(74) *Attorney, Agent, or Firm* — K&L Gates LLP

(57) ABSTRACT

Systems, methods, and computer code products monitor the behavior, health, and/or characteristics of an animal. In one implementation, the animal is positioned inside a waste container placed on a system that is adapted to determine, record and communicate, over a network, various animal health parameters. These parameters can be processed to determine trends, statistics and changes of animal physiological functions. The results can be used to access animal health conditions and issue warnings, alarms, messages, and other notifications to designated caretakers. These notifications may be displayed, for example by computers and/or mobile devices. Data retrieval and review capability can provide improved understanding of an animal's health conditions and facilitate early illness detection.

14 Claims, 10 Drawing Sheets

Related U.S. Application Data continuation of application No. 17/007,861, filed on Aug. 31, 2020, now Pat. No. 11,039,603, which is a continuation of application No. 16/152,026, filed on Oct. 4, 2018, now Pat. No. 10,791,716, which is a continuation of application No. 15/245,083, filed on Aug. 23, 2016, now Pat. No. 10,104,871, which is a continuation of application No. 14/602,693, filed on Jan. 22, 2015, now Pat. No. 9,420,766, which is a continuation of application No. 14/451,169, filed on Aug. 4, 2014, now Pat. No. 9,149,022, which is a continuation of application No. 13/481,605, filed on May 25, 2012, now Pat. No. 8,797,166.

(60) Provisional application No. 61/490,635, filed on May 27, 2011.

(51) Int. Cl.

| | |
|---|---|
| *A01K 5/01* | (2006.01) |
| *A01K 7/00* | (2006.01) |
| *A01K 29/00* | (2006.01) |
| *A01K 31/12* | (2006.01) |
| *G01G 17/08* | (2006.01) |
| *G01G 21/22* | (2006.01) |
| *G08B 21/18* | (2006.01) |
| *G16Z 99/00* | (2019.01) |

(52) U.S. Cl.
CPC ............... *A01K 7/00* (2013.01); *A01K 31/12* (2013.01); *G01G 17/08* (2013.01); *G01G 21/22* (2013.01); *G08B 21/182* (2013.01); *G16Z 99/00* (2019.02); *Y02A 90/10* (2018.01)

(58) Field of Classification Search
CPC ...... G01G 17/08; G01G 21/22; G08B 21/182; G16Z 99/00; Y02A 90/10
USPC ....... 119/51.5, 420; 340/573.1, 573.3, 573.2, 340/539.26, 540, 686.1, 686.6
See application file for complete search history.

(56) References Cited

U.S. PATENT DOCUMENTS

| | | | |
|---|---|---|---|
| 5,901,660 A | 5/1999 | Stein | |
| 5,988,106 A | 11/1999 | Van den Berg | |
| 6,041,737 A | 3/2000 | Hennigan | |
| 6,082,302 A | 7/2000 | Thaler | |
| 6,367,418 B1 | 4/2002 | Ulman et al. | |
| 6,998,980 B2 | 2/2006 | Ingley et al. | |
| 7,274,805 B2 | 9/2007 | Horie | |
| 7,681,527 B2 * | 3/2010 | Pratt | G06Q 10/0833 119/174 |
| 7,905,201 B2 | 3/2011 | Greene et al. | |
| 8,109,237 B1 | 2/2012 | Tsengas et al. | |
| 8,149,125 B2 | 4/2012 | Geissler | |
| 8,683,952 B2 | 4/2014 | Miller | |
| 8,746,178 B2 | 6/2014 | Greene et al. | |
| 8,797,166 B2 * | 8/2014 | Triener | A01K 31/12 340/573.3 |
| 9,420,766 B2 | 8/2016 | Triener | |
| 10,194,639 B2 | 2/2019 | Jordan | |
| 12,022,804 B2 * | 7/2024 | Triener | G08B 21/182 |
| 2002/0139312 A1 | 10/2002 | Reitz | |
| 2003/0163287 A1 | 8/2003 | Vock | |
| 2005/0161007 A1 | 7/2005 | Huisma | |
| 2006/0178579 A1 | 8/2006 | Haynes | |
| 2007/0039556 A1 | 2/2007 | Cook et al. | |
| 2007/0137584 A1 | 6/2007 | Travis | |
| 2007/0288249 A1 | 12/2007 | Rowe | |
| 2009/0187392 A1 * | 7/2009 | Riskey | A61B 5/4238 703/11 |
| 2009/0211531 A1 | 8/2009 | Lai | |
| 2010/0132629 A1 | 6/2010 | Jalbert et al. | |
| 2010/0198024 A1 | 8/2010 | Elazari-Volcani | |
| 2010/0263596 A1 | 10/2010 | Schumann et al. | |
| 2011/0035403 A1 * | 2/2011 | Ismalon | G06F 16/487 707/769 |
| 2011/0120383 A1 * | 5/2011 | Greene | A01K 11/008 119/417 |
| 2011/0139076 A1 | 6/2011 | Pu et al. | |
| 2012/0199076 A1 | 8/2012 | Biede et al. | |
| 2014/0182517 A1 | 7/2014 | Miller | |

FOREIGN PATENT DOCUMENTS

| | | |
|---|---|---|
| JP | 2006226919 | 8/2006 |
| JP | 2006042670 | 12/2006 |
| WO | 2007/102708 | 9/2007 |
| WO | 2010/122252 | 10/2010 |
| WO | 2011019068 | 2/2011 |
| WO | 2012/005672 | 1/2012 |

* cited by examiner

400

402

Sleep (low power mode);
wait for event

404

Event: edge detected on sleep mode pin of the microcontroller

406

Switch to full power mode,
Read input ports

408

Weight change?

No

416

410

Yes

Initiate weight determination

Respond to the network request; transfer saved data over the network

414

Record weight, date and time on a tangible medium

Tangible Medium

412

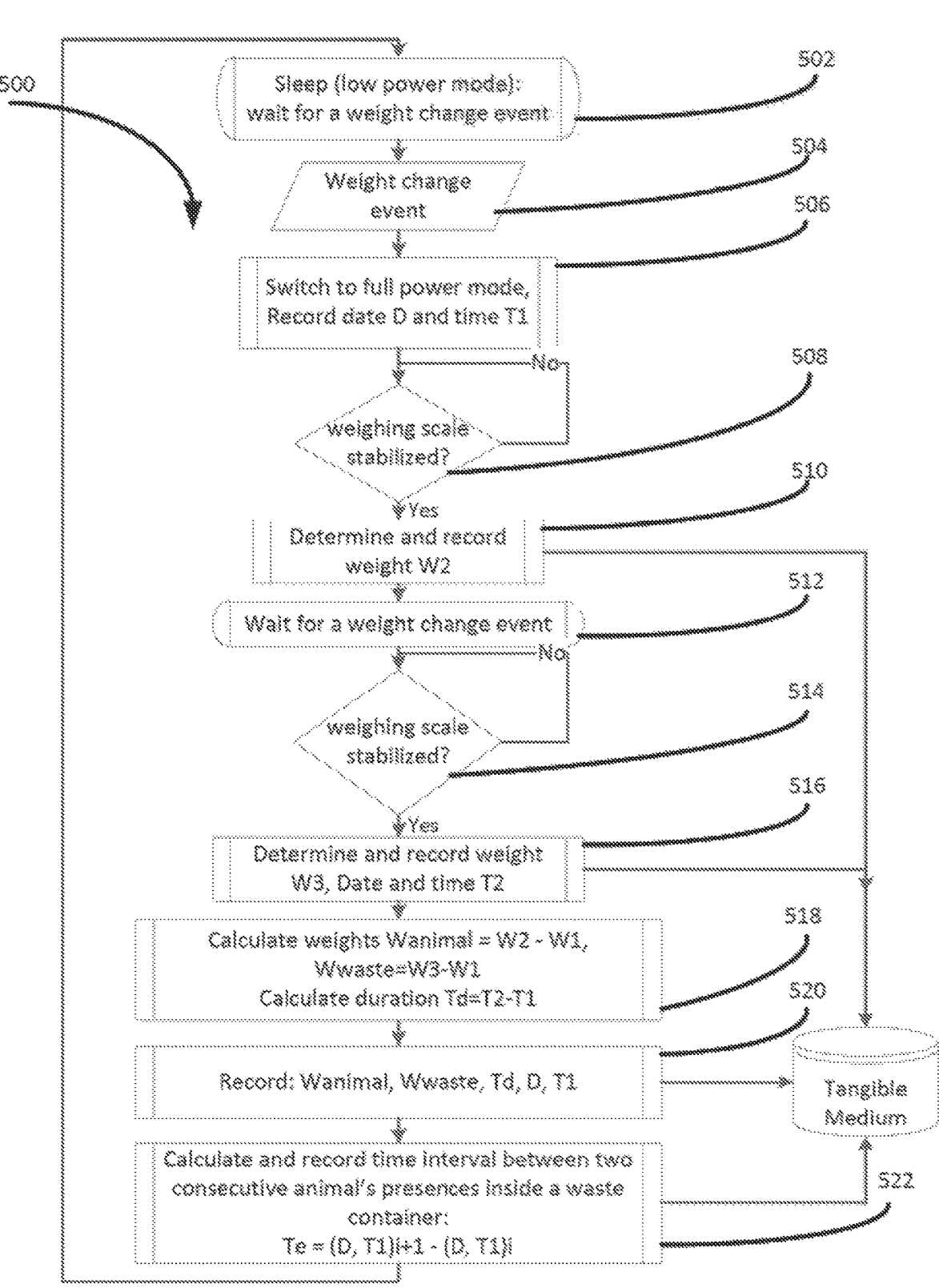

500

502 — Sleep (low power mode): wait for a weight change event

504 — Weight change event

506 — Switch to full power mode, Record date D and time T1

508 — weighing scale stabilized?    No

510 — Yes    Determine and record weight W2

512 — Wait for a weight change event    No

514 — weighing scale stabilized?

516 — Yes    Determine and record weight W3, Date and time T2

518 — Calculate weights Wanimal = W2 - W1, Wwaste=W3-W1 Calculate duration Td=T2-T1

520 — Record: Wanimal, Wwaste, Td, D, T1

Tangible Medium

522 — Calculate and record time interval between two consecutive animal's presences inside a waste container: Te = (D, T1)i+1 - (D, T1)i

902 Start Identification

904 Use Animal Weight

906 Within confidence interval?

YES

NO

908 Use Weight Signature

910 Within confidence interval?

YES

NO

912 Use Behavior and Physiology signature

914 Within confidence interval?

YES

NO

916 Store the data as "Unidentified"

918 Identification completed

SYSTEMS, METHODS AND COMPUTER PROGRAM PRODUCTS FOR MONITORING THE BEHAVIOR, HEALTH, AND/OR CHARACTERISTICS OF AN ANIMAL

CROSS REFERENCE TO RELATED APPLICATIONS

This application is a continuation of U.S. patent application Ser. No. 17/320,921 titled "SYSTEMS, METHODS AND COMPUTER PROGRAM PRODUCTS FOR MONITORING THE BEHAVIOR, HEALTH, AND/OR CHARACTERISTICS OF AN ANIMAL" filed May 14, 2021; which is a continuation of U.S. patent application Ser. No. 17/007,861 titled "SYSTEMS, METHODS AND COMPUTER PROGRAM PRODUCTS FOR MONITORING THE BEHAVIOR, HEALTH, AND/OR CHARACTERISTICS OF AN ANIMAL" filed Aug. 31, 2020 and issued as U.S. Pat. No. 11,039,603 on Jun. 22, 2021; which is a continuation of U.S. patent application Ser. No. 16/152,026 titled "SYSTEMS, METHODS AND COMPUTER PROGRAM PRODUCTS FOR MONITORING THE BEHAVIOR, HEALTH, AND/OR CHARACTERISTICS OF AN ANIMAL", filed Oct. 4, 2018 and issued as U.S. Pat. No. 10,791,716 on Oct. 6, 2020; a continuation of U.S. patent application Ser. No. 15/245,083 titled "SYSTEMS, METHODS AND COMPUTER PROGRAM PRODUCTS FOR MONITORING THE BEHAVIOR, HEALTH, AND/OR CHARACTERISTICS OF AN ANIMAL", filed Aug. 23, 2016 and issued as U.S. Pat. No. 10,104,871 on Oct. 23, 2018; which is a continuation of U.S. patent application Ser. No. 14/602,693 titled "SYSTEMS, METHODS AND COMPUTER PROGRAM PRODUCTS FOR MONITORING THE BEHAVIOR, HEAL TH, AND/OR CHARACTERISTICS OF AN ANIMAL", filed Jan. 22, 2015 and issued as U.S. Pat. No. 9,420,766 on Aug. 23, 2016, which is a continuation of U.S. patent application Ser. No. 14/451,169 titled "SYSTEMS, METHODS AND COMPUTER PROGRAM PRODUCTS FOR MONITORING THE BEHAVIOR, HEALTH, AND/OR CHARACTERISTICS OF AN ANIMAL", filed Aug. 4, 2014 and issued as U.S. Pat. No. 9,149,022 on Oct. 6, 2015; which is a continuation of U.S. patent application Ser. No. 13/481,605 titled "SYSTEMS, METHODS AND COMPUTER PROGRAM PRODUCTS FOR MONITORING THE BEHAVIOR, HEALTH, AND/ OR CHARACTERISTICS OF AN ANIMAL", filed May 25, 2012 and issued as U.S. Pat. No. 8,797,166 on Aug. 5, 2014, which claims the benefit of U.S. Provisional Patent Application Ser. No. 61/490,635, titled "SYSTEM, METHOD AND APPARATUS FOR MONITORING ANIMAL HEALTH", filed May 27, 2011, all of which are incorporated herein by reference in their entireties.

FIELD OF THE INVENTION

The present disclosure relates to the field of animal health and behavior monitoring, and more particularly, systems, methods, and computer program products for determining, monitoring, processing, recording, and transferring over a network various physiological and behavioral parameters of animals.

BACKGROUND

It is animals' natural instinct to hide any signs of weakness, illness and disease, and animals do this very well. In nature, weak animals are an easy prey for predators, or an easy target for their peers, competing over food resources, leadership or mates. Household pets and companion animals are not different from wild animals in this respect: they also hide signs of weakness, illness and disease. For this reason, signs of disease in animals frequently go unnoticed for some time, until the disease progresses to more advanced stages and signs of disease become more severe and observable. Early detection of diseases always leads to the best chance of recovery, as stated by veterinarian doctors.

Presently available approaches for companion animal health monitoring do not include continuous automated quantitative methods and means but rather rely on qualitative observations by animal owners and caretakers and periodic or intermittent veterinarian exams. One of the quantitative means for companion animal health monitoring is periodically weighing on weighing scales and recording the result and comparing with the result of previous weighings such as weighing at home or at a veterinarian office.

Such manual approaches are cumbersome and do not provide timely access to animal health characteristics, the weighing takes place mostly irregularly, not sufficiently frequent and lacks consistency in weighing and tracking changes in body weight on a periodic basis such as daily. Also, manual processes are prone to inaccuracies, incompleteness and loss of data; furthermore, keeping the animal steady on a weighing scale during the weighing is challenging because the animal, which has been forced onto the weighing scale, is naturally trying to move around, or even step off or jump off of the weighing scale.

SUMMARY

Embodiments of the present disclosure include systems, methods and computer program products for monitoring the behavior, health, and/or characteristics of an animal. The embodiments can include a sensor configured to detect the presence (including absence by recording the animal's arrival and departure times) of the animal; a measuring device configured to measure a characteristic of the animal whenever presence of the animal is detected; and a storage device configured to store the measured characteristics of the animal. Additionally, a processor can be included and configured to calculate derived data from the measured characteristics.

The storage device can be further configured to store threshold alert data and wherein the system can further comprise a processor configured to compare a measured characteristic and/or derived data to the stored threshold alert data and to send an alert when the measured characteristic or derived data crosses the threshold alert data. The measured characteristic can be: the animal's weight; the weight of the animal's waste; the weight of a platform before the presence of the animal was detected; the combined weight of the platform and the animal after the presence of the animal was detected; the weight of a platform after the departure of the animal was detected; the weight of the food consumed by the animal; the weight of the water consumed by the animal; the date when presence of the animal is detected; the time when presence of the animal is detected; the time when departure of the animal is detected; the duration of time between detection of the presence of the animal and the departure of the animal; or another characteristic. The derived data can be: the daily frequency with which presence of the animal is detected; the cumulative daily weight of the animal's waste; the cumulative daily weight of the food consumed by the animal; the cumulative daily weight of the water consumed by the animal; the average daily weight of the animal; the maximum and the minimum daily weight of the animal; the cumulative daily duration of time between each detection of the presence of the animal and the departure of the animal; the average, maximum and minimum rates of food and water consumption, expressed in weight of food and water consumed per unit of time; the cumulative daily number of times the presence of the animal is detected; the amount of time since the last time presence of the animal is detected; the average daily time interval between instances where presence of animal is detected; or another piece of derived data. The system can also include an identification sensor configured to identify the animal from a plurality of animals after presence of the animal is detected. The system can be a stand-alone apparatus or can have remote processing in the cloud Further features of the present disclosure, its nature and various advantages will be more apparent from the accompanying drawings and the following detailed description.

BRIEF DESCRIPTION OF THE DRAWINGS

FIG. 5 is a logical flow-chart illustrating one exemplary method for determining animal behavior, health, and or characteristics, according to one embodiment of the present disclosure

DETAILED DESCRIPTION

Figure 1:
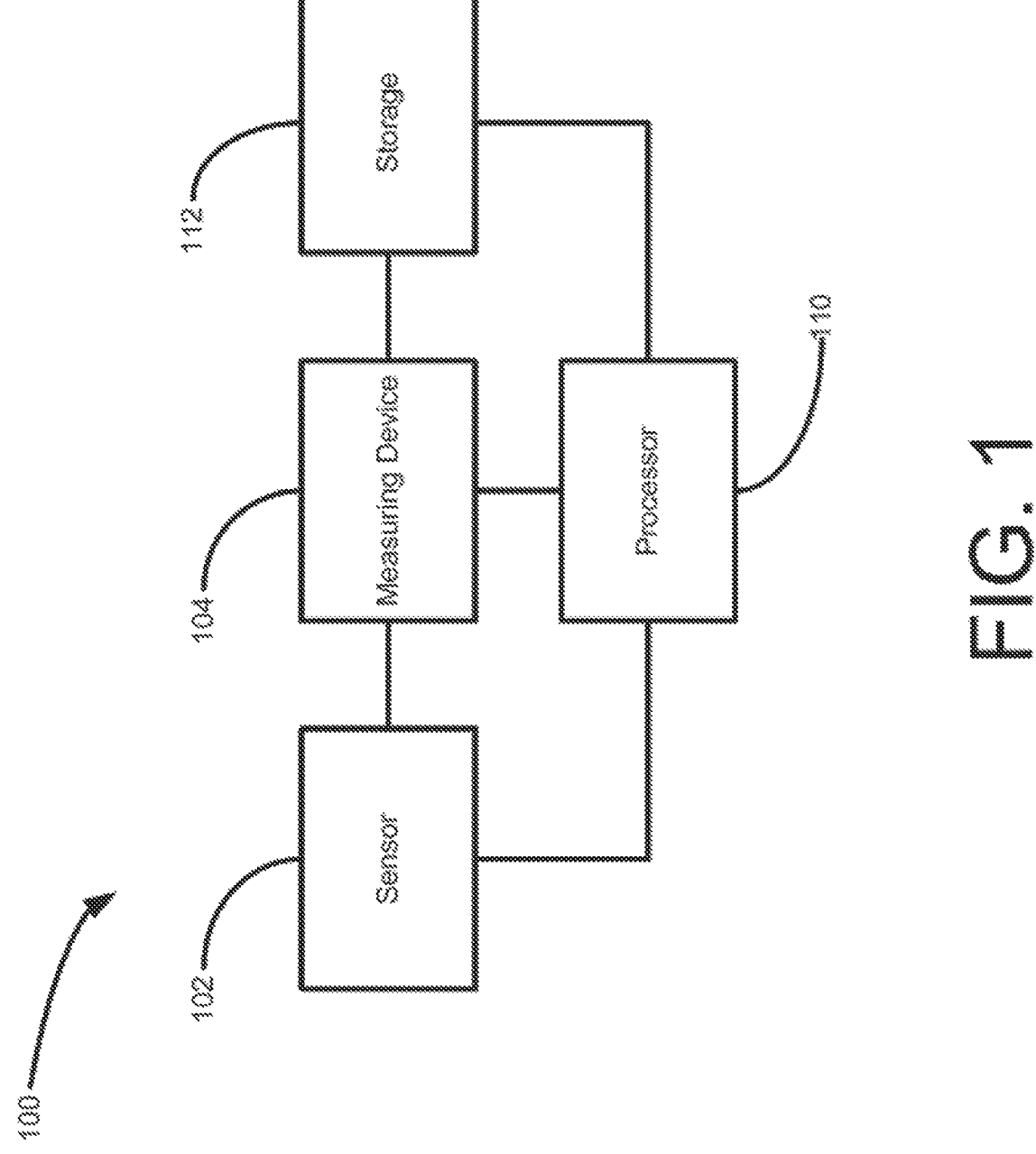
FIG. 1 is a block diagram illustrating an exemplary animal behavior, health and/or characteristic monitoring system, according to one embodiment of the present disclosure.

Embodiments of the present disclosure will now be described in detail with reference to the drawings, which are provided as illustrative examples so as to enable those skilled in the art to practice the present disclosure. Notably, the figures and examples below are not meant to limit the scope of the present disclosure to a single embodiment, but other embodiments are possible by way of interchange of or combination with some or all of the described or illustrated elements. Wherever convenient, the same reference numbers will be used throughout the drawings to refer to same or like parts.

Where certain elements of these embodiments can be partially or fully implemented using known components, only those portions of such known components that are necessary for an understanding of the present disclosure will be described, and detailed descriptions of other portions of such known components will be omitted so as not to obscure the present disclosure.

In the present specification, an embodiment showing a singular component should not be considered limiting; rather, the present disclosure is intended to encompass other embodiments including a plurality of the same component, and vice-versa, unless explicitly stated otherwise herein.

Further, the present disclosure encompasses present and future known equivalents to the components referred to herein by way of illustration.

Embodiments of the present disclosure seek to provide systems, methods and apparatus for animal health monitoring with the benefit of an early detection of animal sickness and notification to the owner or caretaker of such animal. Embodiments of the present disclosure can also be used for generating data over time for statistical processing of an animal's habits and comparing the data with a set of data for other animals, for purposes of understanding a particular animal's health trends and variations in an animal's state of health, for monitoring an animal's state of health and possibly using these data in scientific research. Another embodiment of the present disclosure can be used for monitoring and understanding animal's response to various types of food, various climate changes and other external factors. Furthermore, embodiments can be used to track a recuperation of sick animals undergoing a veterinarian treatment; if the improvement in the animal's state of health is too slow or stalled, a proactive measures can be taken by a treating veterinarian, such as change in the treatment. Furthermore, the health parameters monitored and stored over time as historical data, can be used by the veterinarians and animal owners and caretakers alike, to assess trends and changes in animal's state of health over time. Still another embodiment can be used to monitor growth of baby animals, compute their rate of growth continuously and automatically generate warnings if unexpected changes in the rate of growth detected.

Embodiments may be used to determine and record various animal's health parameters, such as the animal's weight, the weight of animal's waste left in a waste container every time animal visits the waste container, a duration of animal's presence in the waste container, as well as the date and time of every attendance of the waste container; the weight of the waste container without animals in it is also periodically measured and recorded. These data can be recorded continuously from the moment of system installation and activation throughout animal's life for as long as the system is in place and operational. The derivative data can be daily frequency of the trips to the waste container, cumulative daily amount of waste deposited by an animal in the waste container, average daily body weight of an animal, cumulative daily time duration that an animal spent in the waste container, cumulative number of times a waste has been deposited in the waste container by a single or multiple animals since said waste container has been cleaned from the waste most recently.

Embodiments can apply various mathematical and algorithmic techniques, such as bivariate, multivariate and trend analysis. The combination of raw data collected over time and processed (derived) data accumulated over time for each animal can represent a typical profile of behavior, physiology and habits of said animal, that we call here a typical health profile. Further embodiments can use various mathematical and algorithmic techniques, such as calculation of a covariance matrix and further application of Kalman filter for tracking the mean and covariance of an evolving process and, finally, for detecting if new incoming data is atypically deviating from the typical data profile. Further trend analysis help to determine whether said atypical variation has been random or a trend is developing. The described processing can facilitate detecting such trends early on.

A processing of the data can derive additional information about animal's health, such as trends in animal's weight changes, whether increase or decrease, irregularities in the frequency of waste container attendance and duration of animal's presence in the waste container, irregularities and trends in animal's waste weight changes. Application of various statistical methods can derive further information about animal's health, such as minimum, maximum, mean and median of the mentioned above parameters. Furthermore, if a database of plurality of animals is created and maintained, the described above processing can be applied to all or a subset of animals chosen by one of several criteria, such as animal's specie, bread, age or range of ages, gender, geographic location, size/weight or range of sizes/weights, type of food consumed by the animal etc.

Embodiments of the present disclosure can provide fully automated way to consistently measure and electronically record animal's weight on a daily basis, without disturbing the animal or disrupting its natural behavior. An apparatus with weighing and time measurement capabilities can be embedded in various animal auxiliary equipment, such as: placed underneath a waste container, as a platform underneath a food container or a water container or underneath both a food and a water container, underneath animal's bed, underneath animal's housing or any other gear where animal comes naturally and dwells for a period of time sufficient to perform a body weight and time measurements. In the case of avian animals (birds) contained inside a cage, an apparatus with weighing and time measurement capabilities can be embedded between the cage and a kabob or perch on which a bird typically dwells for at least some time daily; an apparatus can be embedded in a vertical line of a cord, rope or wire between the cage and the kabob in a way that the upper side of the apparatus is attached to the cage or the line, and the lower part of the line, supporting the kabob or perch, can be attached to the lower side of the apparatus. Carabiners or similar auxiliary devices can be used on both sides of the apparatus for such an attachment.

Embodiments of this present disclosure can leverage animals' natural behavior: animals come to their waste containers on their own terms, without anybody forcing them to do so, and on their own schedule. While in the waste container, they do move around pretty actively while sniffing, digging the substance such as litter, and looking for a spot to evacuate their bowels or bladder; however, during the bowel or bladder evacuation, animals naturally focus on this process and completely or nearly stop moving inside the waste container. This can be an advantageous moment to measure and capture their body weight, which is calculated as a difference between the weight of the waste container without the animal inside it before the animal arrived in the waste container, and the combined weight of the animal and the waste container, measured at the described above timing. Embodiments can include weighing animal's waste as soon the animal has left the waste container after depositing its waste in the waste container; the waste weight is calculated as the difference between the weight of the waste container before the animal's arrival in the waste container and after the animal's departure from the waste container.

In some embodiments data can be continuously captured during the entire duration of the animal's activity inside a waste container, during food or water consumption, sleep or rest until the animal moves away effectively disengaging measurement. Data can be captured by periodically sampling a sensor or sensors, such as weight, pressure or force sensor or sensors (such as strain gauges, load cells, piezo sensors etc.) and converting a contiguous (analog) electrical signal into a digital data.

Embodiments can include various methods of processing an array of digital data applied to extract weight and time measurements. For example, a threshold expressed in an absolute (volts, counts, numbers, weight units) or relative units (e.g. percentage of maximum) can be used to identify an event, such as the animal stepping or jumping onto an apparatus or stepping or jumping off the apparatus. Various digital filtering techniques can be used, such as moving window filters calculating average or median of the data inside the window, or finding minimum or maximum rate of change. One of the use examples can include finding the data point or the region inside the data array where the disturbance was minimum to calculate the weight/pressure/force actually applied on the apparatus.

Said data could be processed inside the apparatus on-the-fly, i.e. applying methods as the data samples come in and not storing the entire data, but only a metadata; or said data could be initially stored in an apparatus in full length or a portion and processed with a delay in the apparatus; or said data could be evacuated from the apparatus to a database, where processing methods can be applied.

In cases where multiple animals use a waste container there may be a need to identify each animal, or at least distinguish between the animals. Each animal can be identified based on its body weight. The animal owner or a caretaker can associate each animal's weight with its name or nickname via a computer user interface. In cases where several animals have so similar body weight that using the animal's body weight to identify each animal becomes unreliable, more sophisticate methods can be used based on each animal's body weight signature. The body weight signature is not only the animal's body weight at the time of a measurement, but also can include the historical body weight fluctuations for each animal; such fluctuations typically vary in their timing (phase), and therefore can be associated with a specific animal. In case several animals have so similar body weight signature that using animal's body weight signature to identify each animal becomes unreliable, more sophisticate methods can be used based on each animal's behavior and physiology signature. Each animal's behavior and physiology signature can take into account typical behavioral and physiological patterns associated with each animal, that is a combination of regularity and typical time of day of the trips to the waste container by each animal, as well as a typical duration of time each animal typically spends in the litter box, and the weight of waste each animal typically deposits in a waste container at each trip to the waste container, depending on the time of day. As such, the animal identification methods use any combination of animal's body weight, typical body weight fluctuations (phase), typical timing (time of day) of the trips to the waste container, duration of time spent in the waste container, and/or the typical weight of waste left in the waste container, as well as many other characteristics.

These and other various methods of animal identification by animal's body weight or by animal's body weight signature can be applied in cases of performing measurements on multiple animals, such as an apparatus used as a platform underneath a food container, water container, both food and water container, animal bed, as well as others. In the case of a system used as a platform underneath a food container, water container, both food and water container, an animal identification method can be based on the animal's weight, weight signature (as described herein) and in addition, animal consumption signature. The animal consumption signature takes into account the amount (weight) of food, water or food and water consumed at each feeding, drinking or feeding and water drinking session, as well as the timing of each session, in particular the time of day of each such session, and duration time of each such session, depending on the time of day of session and overall cumulative daily frequency of such sessions typical for each animal. These and other various methods can support any combination of multiple animals and one or multiple apparatuses, namely: multiple animals and one apparatus, and multiple animals and multiple apparatuses. In the case of multiple animals and one apparatus, these and other methods can be implemented in the apparatus or outside the apparatus on the database or databases. In the case of multiple animals and multiple apparatuses, these and other methods can be implemented on the database or databases that contain the measurement data taken by the multiple apparatuses.

Embodiments of the present disclosure can also include reminders delivered to the user in the form of an automatically generated electronic mail sent to a user-specified electronic mail address; automatically generated text messages sent via SMS (Short Message Service) to a user-specified mobile phone number; automatically generated calendar reminders set up by the system in a user-specified online calendar; automatically generated phone calls to a user-specified mobile or landline phone number; automatically generated messages by a mobile phone application previously installed by the user on his/her mobile phone.

An automatic reminder to clean up a waste container (scoop out animal waste/remove animal waste from a waste container) can also be set by the user. Reminders can be usage based, volume based, time based or based on another criteria. In the case of a usage based reminder, a user can specify a total number of trips to the waste container by an animal or animals, and the system can be set up to count how many times an animal or animals entered a waste container, and generate a reminder after a specified number of trips has been reached. In the case of a volume based reminder, a user can specify a total weight of animal waste deposited in a waste container, and the system can be set up to compute cumulative weight of animal waste deposited in a waste container, and generate a reminder after the specified volume of waste has been reached or exceeded. In the case of a time based reminder, a user can specify a period of time expressed in days and/or hours after reaching which the system may automatically generate a reminder.

An automatic reminder to add a litter or any other substance used in a waste container to a waste container can also be set by the user. This reminder can be usage based, volume based, time based, or based on another criteria. In the case of a usage based reminder, a user can specify a total number of clean up (scoop out animal waste/remove animal waste from a waste container) cycles of a waste container, and the system can be set up to count a number of a waste container clean up cycles (how many times an animal waste has been removed from a waste container) and generate a reminder after the specified number of clean up cycles has been reached. In the case of a volume based reminder, a user can specify a total weight of a waste container (a combined weight of a waste container and animal waste deposited in a waste container over time), and the system can be set up to generate a reminder after the specified weight of a waste container has been reached or the weight of the waste container decreased below the specified weight, following a cleaning of the waste container (scooping out animal waste/removing animal waste from the waste container) by a user. In the case of a time based reminder, a user can specify a period of time expressed in days and/or hours after reaching which the system can automatically generates a reminder.

An automatic event tracker can also be set by the user. Embodiments of the present disclosure can be configured to automatically record date and time, time duration and other appropriate parameters of various events. One such event associated with a waste container can be cleaning a waste container (removing animal waste from a waste container) by a user. In this case, embodiments of the present disclosure can be configured to record date and time, time duration of each cleaning and a weight of a waste removed from a waste container. All records can be stored and can be presented to a user in a textual or graphical format per user's request, including a number of cleaning cycles in a specified period of time, such as past N days, weeks, months, years, or between two specified dates. Other such events associated with food and water containers can be: cleaning a food container, adding food to a food container, cleaning a water container, and/or adding water to a water container, among other things. Embodiments of the present disclosure can be configured to record date and time, time duration of each event, and, if appropriate, weight of food and water added. All records can be stored and can be presented to a user in a textual or graphical format per user's request, including a number of cleaning cycles in a specified period of time, such as past N days, weeks, months, years, or between two specified dates. Examples of one use of such an event tracker can be to ensure that a caretaker looked after an animal or animals appropriately and performed his/her duties diligently and in timely manner. Another example of one use of such event tracker can be maintaining an animal's health and wellness history for various purposes such as reviewing animal's health and wellness history by a veterinarian or a humane society organization.

Another event which can be associated with a waste container can be each individual animal's activity associated with a waste container. In this case, embodiments of the present disclosure can be configured to record date and time of each animal's trip to a waste container, time duration of animal's presence inside a waste container, and/or weight of waste deposited by an animal in the waste container. All records can be stored and can be presented to a user in a textual or graphical format per user's request, including a number of cleaning cycles in a specified period of time, such as past N days, weeks, months, years, or between two specified dates.

Another event which can be associated with a food and water containers can be each individual animal's activity associated with a food and/or water containers. In this case, embodiments of the present disclosure can be configured to record date and/or time of each animal's trip to food and/or water containers, time duration of each animal's presence on top of an apparatus that is essentially the duration of feeding and/or water drinking, and/or weight of food and water consumed by an animal. Embodiments of the present disclosure can be configured to calculate an average rate of food and/or water consumption.

Another event which can be associated with an animal can be each individual animal's activity associated with an animal bed. In this case, embodiments of the present disclosure can be configured to record date and/or time of each animal's arrival to and departure from the animal bed, duration of time spent by each animal in the animal bed, and sleeping patterns of each animal. The system can identify when the animal is at rest and when the animal is moving in the bed, record date, time, and time duration of each such event. Embodiments of the present disclosure can be configured to calculate daily cumulative amount of time an animal spends in the bed, daily cumulative amount of deep sleep time without disturbance, daily cumulative number of animal movements in its sleep, and calculate animal sleep quality score or sleep quality index, based on, but not limited to the factors listed above.

Embodiments of the present disclosure can be configured to calculate correlations between any of the measured characteristics and derived data associated with an animal waste container, animal food and water containers, and with and animal bed, for various purposes such as scientific research, generating actionable information for animal owners and caretaker about the influence of food, feeding regiments and other events.

Referring now to FIG. 1, one exemplary implementation of a system for monitoring an animal's behavior, health or characteristics is shown and described in detail. A system 100 according to one embodiment of the present disclosure comprises a sensor 102, a measuring device 104 and a storage device 112. The sensor 102 is configured for detecting the presence (or absence) of the animal. The sensor 102 can be implemented in a variety of ways, including, but not limited to, weighing scales, weight transducers, force transducers, displacement transducers, pressure transducers, weight sensors, force sensors, displacement sensors, pressure sensors, load cells, photographic cameras, video cameras, camcorders, contact thermometers, non-contact thermometers, such as infrared thermometers, laser thermometers, infrared pyrometers, laser pyrometers, litters or litter additives that change their properties, such as color, odor, outgassing, fluorescence, luminescence, when come in contact with animal waste, either urine or excrements, such as Health Meter Early Detection System Cat Litter, First Alert Urinary Tract Infection Detector Cat Litter, Detect™ Cat Litter, Pet Ecology Scientific Professional Cat Litter and a combination thereof. Various auxiliary means to determine animal's presence or absence at a particular location or height, such as optical sensors, optical reflecting sensors, LED/photodiode pair optical sensors, LED/phototransistor pair optical sensors, laser diode/photodiode pair optical sensors, laser diode/phototransistor pair optical sensors, optocouplers, optical fiber coupled optical sensors, magnetic sensors, weight sensors, force sensors, displacement sensors, pressure sensors, various proximity sensors, such as inductive proximity sensors, magnetic proximity sensors, capacitive proximity sensors, and/or a combination thereof.

The measuring device 104 is configured to measure a characteristic of the animal whenever presence of the animal is detected or upon the animal's departure. The measuring device 104 can be implemented in a variety of ways including, but not limited to, weighing scales, weight transducers, force transducers, displacement transducers, pressure transducers, weight sensors, force sensors, displacement sensors, pressure sensors, real time clocks, timers, counters, and/or a combination thereof The storage device 112 is configured to store the measured characteristics of the animal. Exemplary storage devices 112 can include, but are not limited to, memory devices, data storage devices and a combination thereof such as memory chips, semiconductor memories, Integrated Circuits (IC's), non-volatile memories or storage device such as flash memories, Read Only Memories (ROM's), Erasable Read Only Memories (EROM's), Electrically Erasable Read Only Memories (EEROM's), Erasable Programmable Read Only Memories (EPROM's), Electrically Erasable Programmable Read Only Memories (EEPROM's), an Electrically Erasable Programmable Read Only Memory (EEPRO), volatile memories such as Random Access Memories (RAM's), Static Random Access Memories (SRAM's), Dynamic Random Access Memories (DRAM's), Single Data Rate memories (SDR's), Dual Data Rata memories (DDR's), Quad Data Rate memories (QDR's), microprocessor registers, microcontroller registers, CPU registers, controller registers, magnetic storage devices such as magnetic disks, magnetic hard disks, magnetic tapes, optical memory devices such as optical disks, compact disks (CD's), Digital Versatile Disks (DVD's), Blu-ray Disks, Magneto Optical Disks (MO Disks) and/or a combination thereof. In one embodiment, the storage device comprises a semiconductor RAM IC for an intermediate recording of the behavior, health, and/or characteristics of the animal, and then transfer of the data to a flash memory IC for non-volatile recording. Another embodiment can be an external memory device known as a USB flash memory, also known as a thumb drive.

The system 100 can also include a processor 110 configured to calculate derived data from the measured characteristics. Exemplary processors can refer, without limitation, to electronic circuits, systems, modules, subsystems, sub modules, devices and combinations thereof, such as Central Processing Units (CPU's), microprocessors, microcontrollers, processing units, control units, tangible media for recording and/or a combinations thereof. The storage device 112 can also be configured to store derived data from the processor 110. In one embodiment, the sensor 102, measuring device 104, and storage 112 are assembled into a stand-alone apparatus. In another embodiment, the sensor 102, measuring device 104, storage 112, and processor 110 are assembled into a stand-alone apparatus. In still another embodiment, the processor 110 and/or storage 112 are configured as remote cloud storage devices.

In addition, the storage device 112 can be configured to store threshold alert data. The threshold alert data can correspond to thresholds, either predetermined or set by the user, for either measured data or derived data. The processor 110 can also be configured to compare the appropriate measured or derived data to threshold data, determine if a threshold has been meet (either by reaching, exceeding, or falling below a threshold value), and send an alert when the threshold data has been met. In some embodiments, a threshold condition can include, but not be limited to, multiple conditions, a logical statement, a predetermined sequence of events and/or a combination thereof.

Sample measured characteristics and derived data can include, but are not limited to, any observable measure of the health or physical state of an animal determined by various means, and may be quantitative or qualitative, such as a weight of an animal, a weight of a waste deposited by an animal in a waste container, a body temperature of an animal, the weight of a platform before the presence of the animal is detected, the combined weight of the platform and the animal after the presence of the animal was detected, the weight of a platform after the departure of the animal was detected, the weight of the food consumed by the animal, the weight of the water consumed by the animal, the date when presence of the animal is detected, the time when presence of the animal is detected, the time when departure of the animal is detected, the duration of time between detection of the presence of the animal and the departure of the animal, a tip of the nose temperature of an animal, an ear temperature of an animal, an anal temperature of an animal, a height of an animal, a video or a picture or plurality thereof of an animal, a video or a picture or plurality thereof of animal body parts such as a face, an eye, eyes, parts of a skin, a paws, a video or a picture or plurality thereof of a waste container, a video or a picture or plurality thereof of a waste left by an animal, a video or a picture or plurality thereof of a substance in a waste container, a voice recording for the duration of animal's presence inside a waste container, a result of chemical, biological or biochemical analysis, the daily frequency with which presence of the animal is detected, the cumulative daily weight of the animal's waste, the cumulative daily weight of the food consumed by the animal, the cumulative daily weight of the water consumed by the animal, the average daily weight of the animal, the maximum and the minimum daily weight of the animal, the cumulative daily duration of time between each detection of the presence of the animal and the departure of the animal, the average, maximum and minimum rates of food and water consumption, expressed in weight of food and water consumed per unit of time, the cumulative daily number of times the presence of the animal is detected, the amount of time since the last time presence of the animal is detected, or the average daily time interval between instances where presence of animal is detected.

Figure 2:
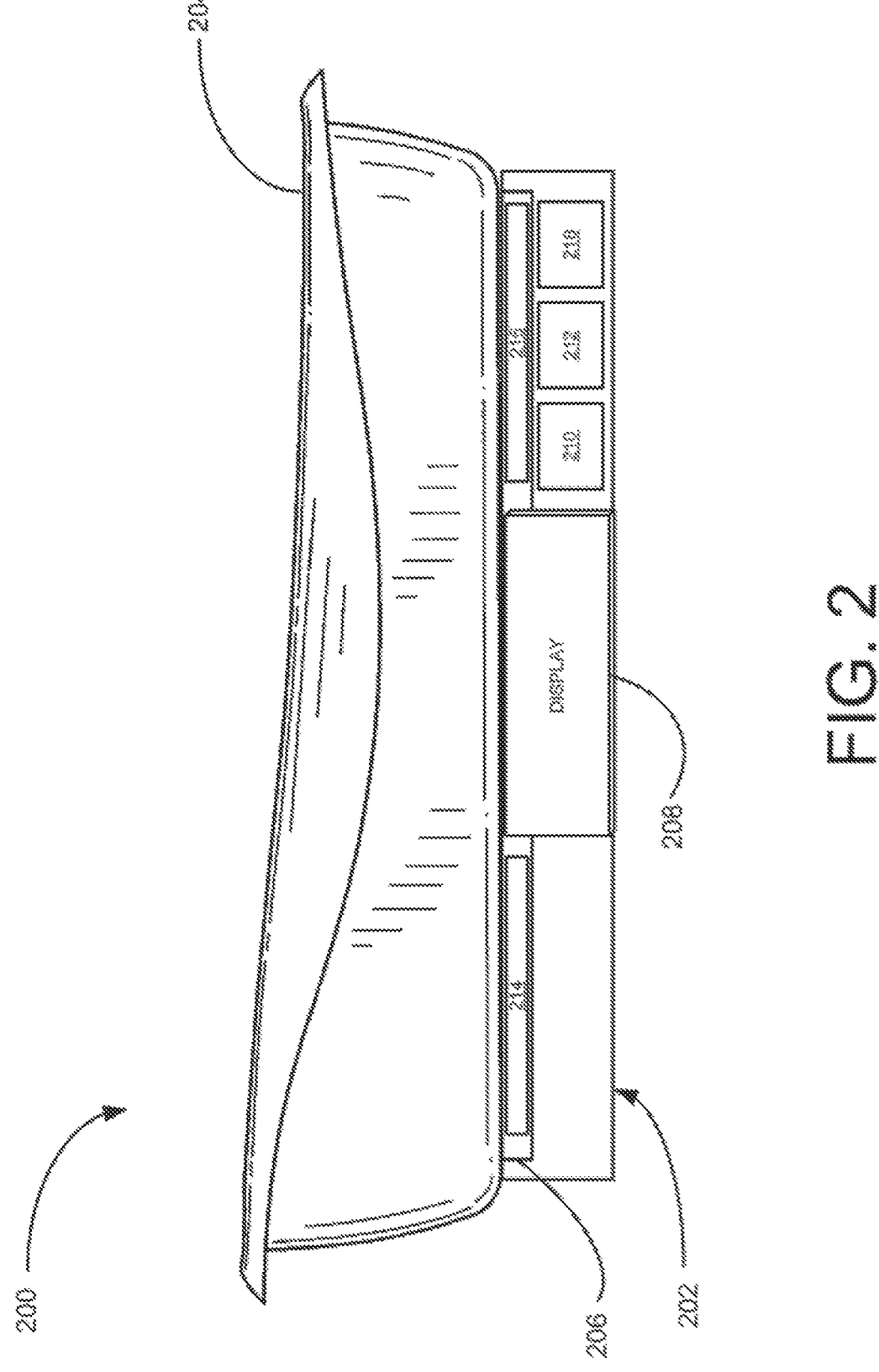
FIG. 2 is a graphical illustration of an exemplary animal behavior, health, and/or characteristics monitoring system comprising a weighing scale and a litter box, according to one embodiment of the present disclosure.

An exemplary implementation compatible with any animal that uses a waste container for emptying its bowels, bladder and a combination thereof regularly, periodically or occasionally is shown in FIG. 2. In FIG. 2, the system 200 comprises a device 202 configured to measure and/or determine one or more characteristics of the animal, while the animal is disposed within a waste container 204. In some implementations, the device 202 comprises a weight scale 206 (electronic or mechanical) coupled to a digitized readout apparatus 208 that is coupled to a processor 210. In other implementations, the weight scale 206 is directly coupled to the processor 210 via a digital interface (not shown). In some implementations, the device 202 also includes a non-volatile storage device 212 configured to store raw measurements and (in some variants) health parameters computed by the processor 210. In some implementations, the device 202 is adapted to detect a weight change event, measure and record weight, date, time and duration of the event. In some variants, the scale 206, comprises a flat top surface that is configured beneath the container 204.

In some variants, the container 204 is secured to the scale 206 via any of the variety of appropriate attachment mechanisms, including, for example, an anti-slip surface, a mechanical latch, a tongue and groove configuration, an adhesive, locking, wedging, suction, fastening such as a hook-and-loop fastener (also known under a brand name Velcro), etc., in order to prevent container movements relative to the scale, particularly when the animal is in contact with the container.

In some implementations, the scale 206 comprises an adaptor (not shown) configured to accommodate a variety of container sizes (and shapes), as may be required in order to handle animals of various sizes. In one variant, the adapter comprises an expandable plate arrangement that is similar to a common dining table. In another variant, the adapter comprises a removable plate, configured to conform to the shape of the waste container 204. In some implementations, the container 204 comprises the device 202, such that the device 202 is an integral part of the container 204 and such that the bottom of the container 204 serves as the top surface of the device and vice versa.

In some implementations, the processor 210 comprises any suitable microcontroller, such as, for example a Texas Instruments MSP430, Stellaris ARM Cortex-M, C2000, Hercules ARM Microcontrollers; Renesas 78K, RX, H8, M16C, SH Microcontrollers; Atmel AVR, 8051, ARM7, ARMS, Cortex-M3 Microcontrollers; STMicroelectronics ARM Cortex, STM8, STM32 Microcontrollers; Freescale Kinetis ARM Microcontrollers. In some implementations, the processing block is embedded within the electronic scale (e.g., the scale 106).

The processor 210 can be configured to perform a variety of monitoring and processing operations comprising, inter alia, implementation of a state machine, control of digital inputs and outputs, read-out, analog-to-digital converters, which convert analog sensor outputs to digital words, and, optionally, processing of the digital words, various calibrations of device 202 and its subsystems: scale 206, sensor 214, and measuring device 216, control of the input/output block (e.g. a network interface), communicating (via the network interface) raw and/or processed data to a remote network entity, timer block implementation and interface (using for example a real time clock and processing the real time clock to compute current date and time), transfer of the raw real time clock reading or date and time to the network entity, display control and interface with the display and transferring of data to be displayed on the display, interfacing with buttons, as well as other monitoring and processing operations. The processing of the digital words can be a combination of or any of an IIR filter, FIR filter, window averaging or peak removal filters.

The weight scale 206 can include a sensor or sensors 214 and a measuring device 216. The sensor or sensors 214 can be configured for detecting the presence (including the absence) of the animal. The measuring device 216 can be configured to measure a characteristic of the animal whenever the presence of the animal is detected. In this case, the measuring device 216 can be configured to measure the weight of the animal in the container and output electrical signals representing a weight applied to the sensor 214.

The sensor 214 can comprise weighing scales, weight transducers, force transducers, displacement transducers, pressure transducers, weight sensors, force sensors, displacement sensors, and pressure sensors, among other sensors. In fact various pressure, force, displacement or weight sensor can be used, such as strain gauge-based load cells, optical position sensors, piezo displacement and pressure sensors; various types of load cells can also be used, such as single point, planar beam, tension or compression. The sensor 214 can also comprise photographic cameras, video cameras, camcorders, contact thermometers, non-contact thermometers, such as infrared thermometers, laser thermometers, infrared pyrometers, laser pyrometers, litters or litter additives that change their properties, such as color, odor, outgassing, fluorescence, luminescence, when come in contact with animal waste, either urine or excrements, such as Health Meter Early Detection System Cat Litter, First Alert Urinary Tract Infection Detector Cat Litter, Detect™

Cat Litter, Pet Ecology Scientific Professional Cat Litter and a combination thereof. Various auxiliary means to determine animal's presence or absence at a particular location or height, such as optical sensors, optical reflecting sensors, LED/photodiode pair optical sensors, LED/phototransistor pair optical sensors, laser diode/photodiode pair optical sensors, laser diode/phototransistor pair optical sensors, optocouplers, optical fiber coupled optical sensors, magnetic sensors, weight sensors, force sensors, displacement sensors, pressure sensors, various proximity sensors, such as inductive proximity sensors, magnetic proximity sensors, capacitive proximity sensors, and a combination thereof can also be used. The measuring device 116 can be used in combination with the sensor 214 to determine the animal's presence or absence.

In one implementation, the device 200 further comprises an interface block 218, coupled to the processor 210. In some variants, the interface block 218 comprises a display, such as, for example a Liquid Crystal Display (LCD), Light-Emitting Diode (LED), Organic Light-Emitting Diode (OLED), Vacuum Fluorescent Display (VFD). In another variant, the interface block 118 comprises a digital serial interface such as, for example an Universal Serial Bus (USB), Universal Asynchronous Receiver/Transmitter (UART) or Universal Synchronous/Asynchronous Receiver/ Transmitter (USART) that is used in conjunction with communication standards such as RS-422, RS-485 or RS-232, or IEEE 802.3 Ethernet. In another variant, the interface 114 comprises any suitable wireless interface, such as IEEE 802.11x (802.11a, 802.11b, 802.11g, 802.11n) also known as Wi-Fi also known as Wireless LAN (WLAN), IEEE 802.15 also known as Wireless Personal Area Network (Wireless PAN or WPAN), IEEE 802.15.1 also known as Bluetooth, IEEE 802.15.3 also known as High Rate Wireless Personal Area Network (HR-WPAN), IEEE 802.15.4 also known as Low Rate Wireless Personal Area Network (LR-WPAN) and their variety such as ZigBee, MiWi, Wireless Highly Addressable Remote Transducer (Wireless HART), Wireless Universal Serial Bus (Wireless USB). In another variant, the interface block 218 comprises a cellular modem or a cellular network adapter such as General Packet Radio Service (GPRS), GSM (Global System for Mobile Communications, originally Groupe Special Mobile), or Code Division Multiple Access (CDMA) modem, and the processor 210 is implemented as a part of the modem. In some implementations the interface block 218 comprises input means, such as for example, buttons or switches.

In some implementations, the nonvolatile storage device 212 is configured as an integral part of the processor 210. In other implementations, the storage device 212 is embodied within the weight scale 206. In other implementations, the storage device 212 is embodied within the interface block 218. In other implementations, the storage device 212 comprises a flash storage module (fixed or removable), or any other suitable non-volatile recording media module (optical, magnetic, etc.), operably coupled to the processor 210.

In one exemplary implementation, the device 200 comprises a single housing encompassing a weight scale 206, the processor 210, and the storage block 212. In some variants, the device 200 further comprises a wireless input/output interface (e.g., the interface block 218). A waste container 204 is disposed on top of the device 200 using any of the mechanisms described herein, or houses the entire device 202 as described herein.

In another implementation, the device 200 comprises a weight scale module and input/output interface module. In one implementation, the electronic scale module houses the processor and wireless network interface, comprising, e.g., a portion of the interface block 218 of FIG. 2. In one variant, the device 200 is coupled to the input/output module via a digital wired interface (e.g., serial, USB, Ethernet, I2C, or any other applicable interface). In other variants, the input/output interface module is connected to the device 200 via a wireless interface (e.g., WiFi, IR-DA, Bluetooth, etc.). In still another variant, the input/output interface module is connected to the device via the wireless interface. In one variant, the input/output interface module comprises a display unit and input interface (e.g., the buttons). In other variants, the display unit comprises a touch sensitive interface thereby providing input functionality. In another variant (not shown), the display unit comprises LED. In another implementation, the processor and wireless network interface are embodied within the input/output module.

In some variants, the nonvolatile storage (e.g., the 112 of FIG. 1 or 212 of FIG. 2) is embodied within the input/output module. In other variants, the input/output module comprises an interface configured to receive a removable nonvolatile storage module (e.g., a USB flash drive, secure digital card, or a memory stick).

Figure 3:
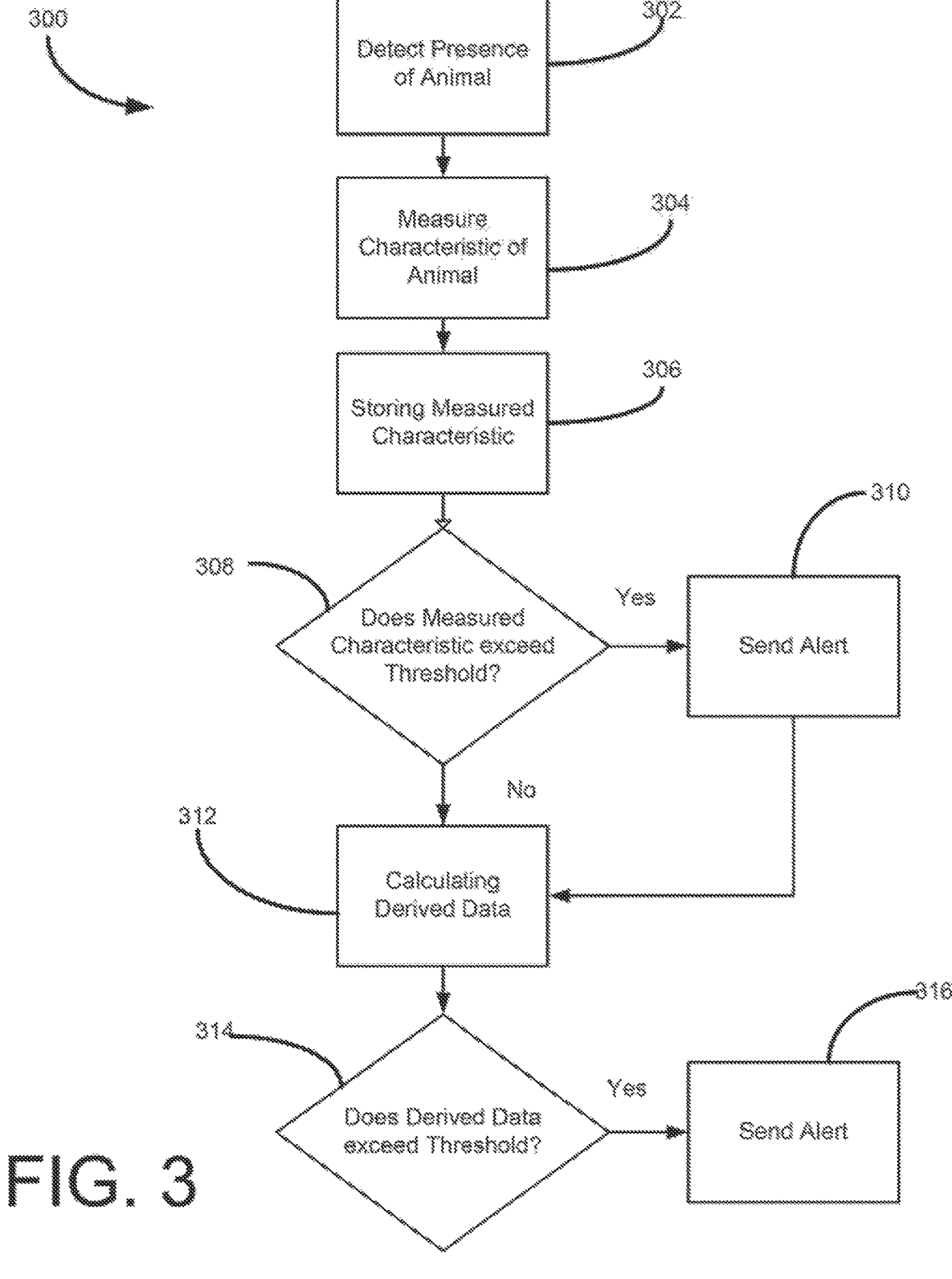
FIG. 3 is a logical flow-chart illustrating one exemplary method of monitoring an animal's behavior, health, and/or characteristics according to one embodiment of the present disclosure.

In another embodiment of the present disclosure, a method for monitoring the behavior of an animal is described as shown in FIG. 3. The presence of an animal is detected in step 302 of method 300. The presence of the animal can be detected in step 302. A characteristic of the animal is measured in 304 upon detecting the animal's presence. The measured characteristic is then stored in step 306. The measured characteristic can be compared to a stored threshold value as illustrated in step 308. If the threshold is crossed, an alert can be sent to the animal's owners in step 310. Derived data can be calculated based on the measured characteristics as illustrated in step 312. The derived data can also be compared to a stored threshold value (step 314) and, if the derived data crosses the threshold data, an alert can be sent to the animal's owners as shown in step 316.

Figure 4:
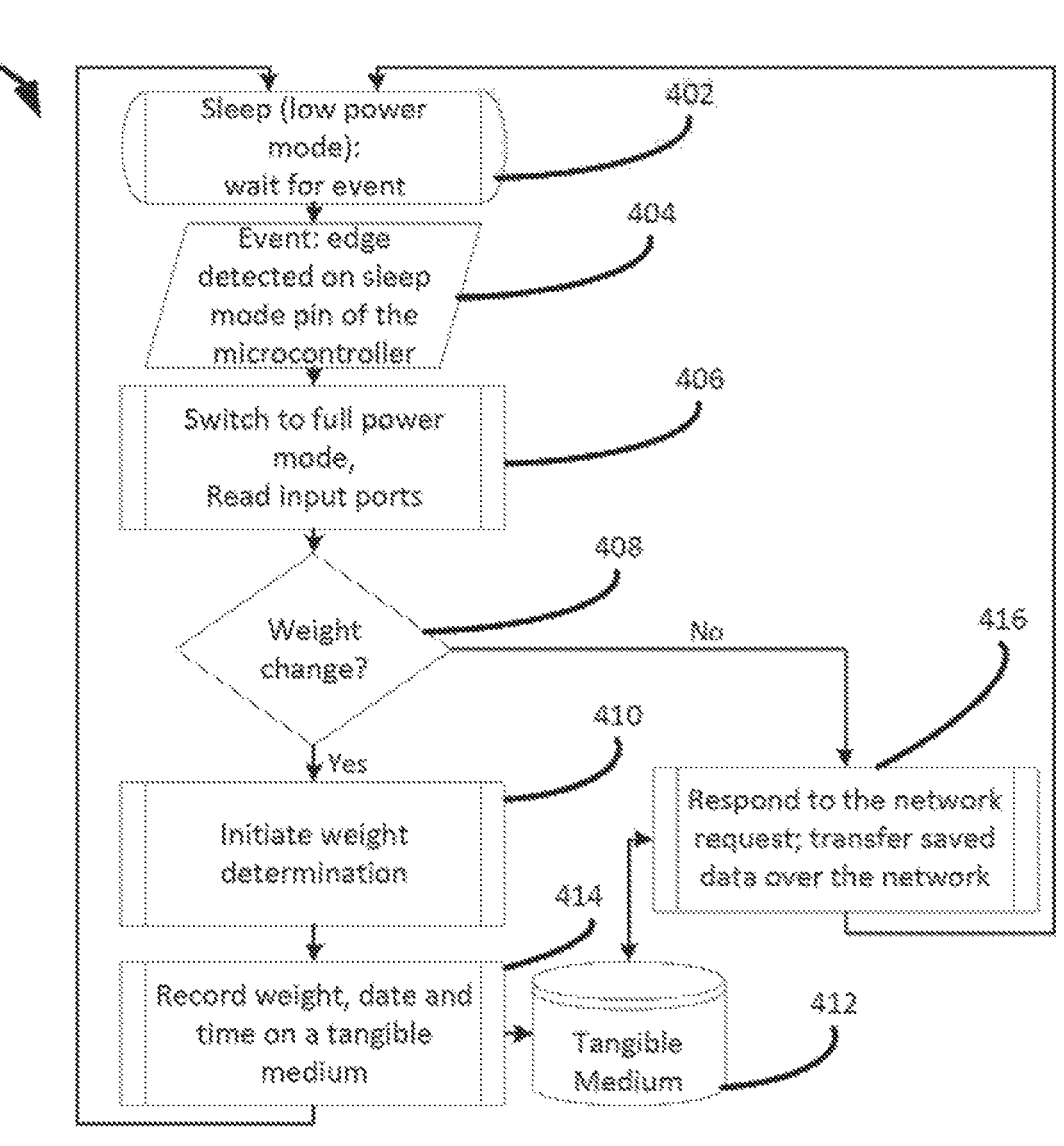
FIG. 4 is a logical flow chart illustrating one exemplary power saving method triggered by an event, according to one embodiment of the present disclosure.

In another aspect of the present disclosure, methods for monitoring an animal's behavior, health, and/or characteristics are described with respect to FIG. 4. The methodology described herein is compatible with any animal that uses a waste container for emptying its bowels, bladder and a combination thereof regularly, periodically or occasionally.

At step 402 of the method 400 of FIG. 4, an exemplary device for monitoring animal's behavior, health, and/or characteristics (e.g., the device 100 of FIG. 1 or 200 of FIG. 2) is a low power mode (sleep mode). At step, 404, an event is detected and the device transitions from the low power to fully operational mode (step 406). In one variant, the event is detected using, for example, edge detection on a wake-up pin of the processor (110 or 210). In another variant, the event is detected using an I/O interrupt due to I/O interface activity. Once in the fully operational mode, the device reads relevant I/O ports at step 406 (e.g., scale input, status of buttons/switches, touch input, network activity, etc.). At step 408, the device determines if there has been a weight change by comparing, for example, the last scale weight reading at a prior time to the current scale reading.

If weight change is detected, the method proceeds to step 410 where the current weight is determined using any of the methodologies described in greater detail herein. At step 412, weight, date and time (and other data) are stored on the non-volatile storage medium. In one variant, additional derived parameters (such as for example a weight change, a running mean, an update threshold, etc.) are stored as well.

If weight change is not detected at step 408, the method proceeds to step 416 to read health parameters, i.e., the parameters recorded at, for example, step 412 at a prior time instance. At step 416, a response, comprising health parameter data read from the nonvolatile storage (e.g., storage 112 of FIG. 1 or 212 of FIG. 2), to the I/O request (e.g., the request detected previously at step 404) is sent via the I/O interface (e.g., the interface 214 of FIG. 2).

In one implementation, while in the low-power mode, the device periodically (e.g. once every second or once every 10 seconds) switches to a full power (operational) mode= (wakes up) for a very short time (e.g. one millisecond or two milliseconds), determines the weight, calculates a difference between the measured weight and a predetermined weight (e.g. the weight determined during the most recent wake up, i.e. 1-10 sec ago), compares the difference with a preprogrammed threshold 306 (e.g. the threshold is ⅓ oz, or 1/100 of the predetermined weight), and if the threshold exceeds the difference, the device stores the measured weight in the tangible medium 308 and returns back to the low power mode (sleep mode); if the difference exceeds the threshold, the device stays in an operational mode. In some implementations, an event can initiate scale activation due to, e.g., an animal entering the waste container, or an animal owner or caretaker cleaning the waste container or adding litter to the waste container. In other implementations, the event comprises activation of the input/output interface (e.g., a user toggling a button, or receipt of a packet via the network interface).

In some implementations, additional behavior, health, and/or characteristic parameters are recorded as well, including but not limited to, weight of the container, weight of the animal, a date and time of a weight determination event, duration of the animal's presence inside the waste container associated with the weight determination event, a weight value of animal waste, a weight value of the waste container, time interval between two consecutive animal's presences inside a waste container, time elapsed since most recent animal's presences inside a waste container.

In some implementations, methods for determining animal's weight, while the animal is positioned inside a waste container, (i.e., the weight change event) comprise:

determining weight of the container before the animal entered the container;

detecting container weight change by using, for example, an edge detection or thresholding technique, where magnitude of the difference between two or more successive weight reading is compared against a predetermined, or adaptively configured threshold, in order to detect an even when the animal enters the waste container;

a moving window or a minimal rate of change algorithm to recognize when an electrical signal or a digital word representing a weight is settled enough to perform a determination of a combined weight of the animal and the waste container, and a subtraction applied to two the determined weight values by subtracting the weight of a waste container from the combined weight of the animal and the waste container, to calculate animal's weight.

In some implementations, date and time of the weight determination event, the duration of the animal's presence inside the waste container associated with the weight determination event, time interval between two consecutive animal's presences inside a waste container, time elapsed since most recent animal's presences inside a waste container are determined using an internal system clock, (e.g., a software or hardware timer of the processor 110 of FIG. 1 or 210 of FIG. 2). Whenever the weight change event is detected (using for example the edge detection technique described supra), corresponding to the animal entering or leaving the waste container, the corresponding readout of the timer is stored in nonvolatile storage (e.g. 112 of FIG. 1 or 212 of FIG. 2). Each event is further labeled with the appropriate flag to denote if it corresponds to (i) the animal entering the container; or (ii) the animal leaving the container.

The time of the animal's presence in the weight container is determined, in one variant, by computing a difference between the two adjacent events associated with the animal leaving the container and the animal entering the container.

In some implementations, a smoothing algorithm (e.g., a low pass filter, or a moving window averaging algorithm) can be used to smooth down the high frequency oscillations of the weight and to enable robust detection when signal representing the weight measurement is settled enough to perform determination of the combined weight of the animal's waste and the waste container. Subsequently, the waste weight can be determined by, for example, subtracting the container weight from the combined weight measurement.

FIG. 5 is a logical flowchart illustrating one exemplary method for determining animal health parameters for use with a system, according to one embodiment of the present disclosure. According to method 500, a system for monitoring an animal's behavior, health, and/or characteristics comprises a sleep mode 502, which is a low power mode configured to preserve the power and extend battery life in one embodiment in which the system is powered by batteries. While in sleep mode 502, the system waits for a weight change event. A weight change event 504 causes the system to move to step 506 at which point the system switches to full power mode and records the current date (D) and time (T1). In step 508, the system waits for the weighing scale to stabilize, and periodically checks whether or not the weighing scale is stable. Once the weighing scale is stable, the weight (W2) is determined and recorded in step 510. Next, the system waits for another weight change event in step 512. As soon as another weight change event is detected, the system again waits for the weighing scale to stabilize in step 514. Once the weighing scale has stabilized, the weight (W3), current date (d), and time (T2) are determined and recorded in step 516. In step 518, the animal's weight Wanimal, the weight of the waste left by the animal Wwaste, and the time duration (Td) spent by the animal in the waste container are calculated are calculated as: Wanimal=W2–W1, where W2 is the weight determined at the step 510 and W1 is the most recent determined and recorded weight prior to the step 502; Wwaste=W3–W1, where W3 is the weight determined at the step 516 and W1 is as described above. Note here that the weight W3 is the last recorded weight, which is used as the weight W1 for the calculations taking place at the step 518 after the current cycle is complete through the steps 520 and 522, back to the state 502. Next duration of time Td is calculated as Td=T2–T1, where T2 is the time determined at the step 516, and T1 is the time determined at the step 506. After the mentioned above calculations are completed, the following are recorded on a tangible medium at the step 520: Wanimal, Wwaste, Td, D, T1. Lastly, at the step 522, time interval Te between two consecutive animal's presences inside a waste container is calculated as Tc=(D, T1)i+1–(D, T1)i, where (D,T1)i+1 are the current date D and time T1 recorded at the step 506 of the current cycle (i+1), and (D, T1)i are date D and time T1 recorded at the step 506 of the preceding cycle (i). Calculated time interval Te is recorded on a tangible medium also at step 522, and the apparatus returns to step 502 sleep mode.

Figure 6:
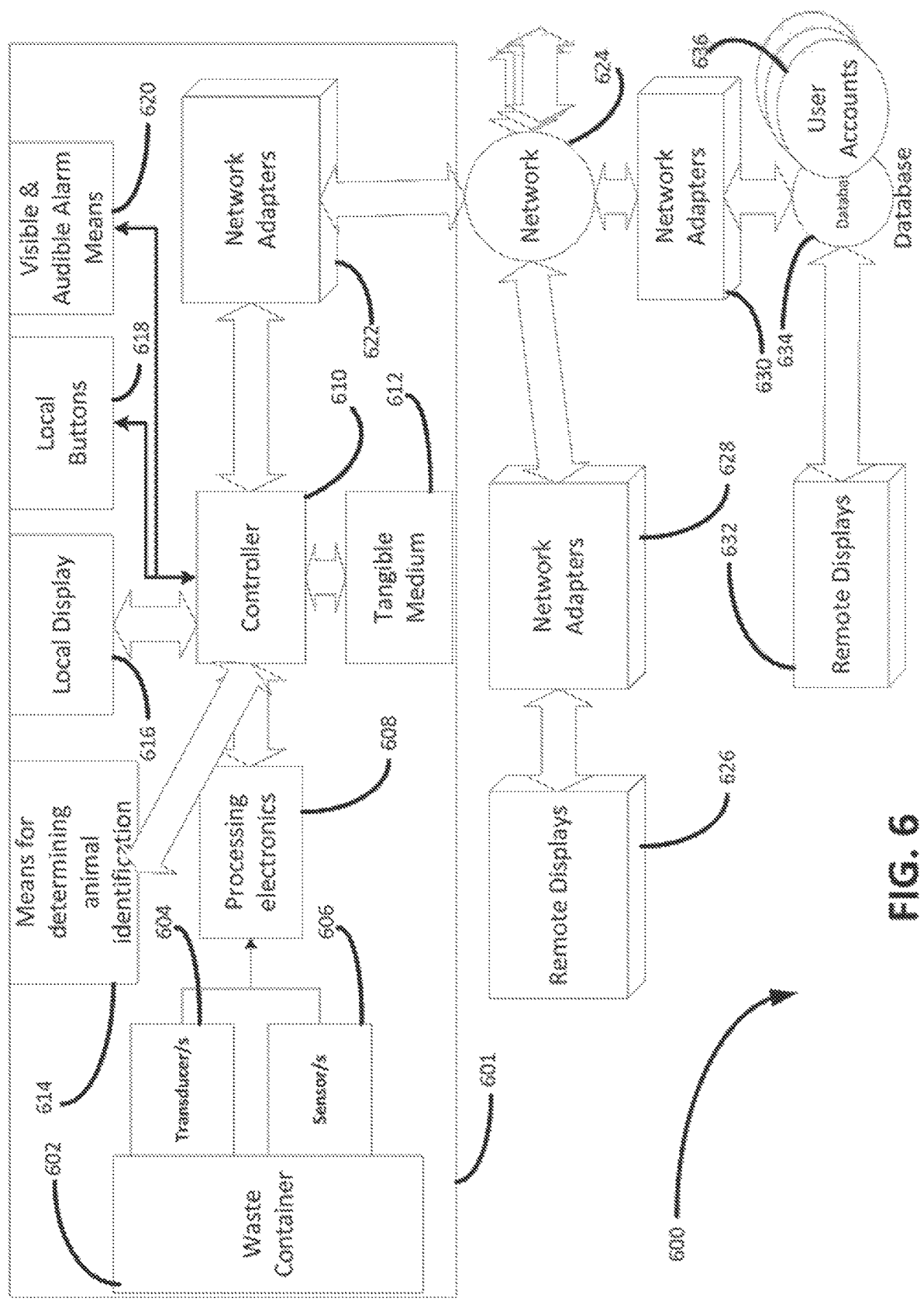
FIG. 6 is a block diagram illustrating a computerized system for monitoring an animal's behavior, health, and/or characteristics, according to one embodiment of the present disclosure.

Referring now to FIG. 6, a block diagram of one exemplary implementation of a system for monitoring an animal's behavior, health or characteristics is shown and described. A system 600, according to one embodiment of the present disclosure, comprises a local device 601, connected to a network 624, to which various remote displays 626 are connected via their various network adapters 628. A central or distributed database 634 is also connected to the network 624 via a single or multiple network adapters 630. Various remote displays 632 are connected to the database or databases 634, where multiple user accounts 636 can be stored.

The local device 601, according to one embodiment of the present disclosure, can comprise a waste container 602, a transducer or transducers 604, a sensor or sensors 606, processing electronics 608, a controller 610, a tangible storage medium 612, an identification sensor configured to identify separate animals 614, a local display 616, local buttons 618, visible and audible alarms 620, and a network adapter 622.

The waste container 602 can be implemented in a variety of ways including, but not limited to a litter box, a litter pan, a litter tray, a cat box, a cat house, a pet mat, a pet potty, a potty pad, a training tray, a layer of grass, a layer of artificial grass, a floor mat, a cardboard box, cardboard, paper sheets, and/or newspaper sheets. In some embodiments, the waste container 602 can be similar to the waste container 204 on FIG. 2.

The a transducer or transducers 604, and/or the sensor or sensors 606 can be configured to detect the presence (or absence) of the animal, and to measure a variety of physical parameters, including, but not limited to weight, force, pressure, displacement, incoming and/or reflected light, temperature, color, odor, outgassing, fluorescence, luminescence and/or a combination thereof. In some embodiments, the transducer or transducers 604, and/or the sensor or sensors 606 can be similar to the sensor 102 on FIG. 1.

The processing electronics 608 processes an electrical signal outputted by the transducer or transducers 604, and/or the sensor or sensors 606, and converts the electrical signal into a stream of digital data, which can be transferred to a controller 610. The controller 610 can be configured to manage the local device 601 and control the processing electronics 608, the tangible storage medium 612, the identification sensor 614, the local display 616, the local buttons 618, the visible and audible alarms 620, and the network adapter 622. The controller 610 can control the timing of the processing electronics 608 and digital data retrieval from the processing electronics 608. The tangible storage medium 612 can be configured to store the measured characteristics of the animal. Exemplary tangible storage media 612 can include, but are not limited to, devices similar to those described as storage devices 112 on FIG. 1. The controller 610 controls data writing to and reading data from the tangible storage medium 612. The identification sensor 614 can be implemented in a variety of ways, including, but not limited to, an animal's weight, a Radio Frequency Identification (RFID), a barcode, a picture of an animal, a video recording of an animal, and a combination thereof. The controller 610 can control the identification sensor 614 in a variety of ways; in one exemplary implementation the controller 610 commands an RFID unit to activate, and reads an RFID code from the RFID unit; in another exemplary implementation the controller 610 determines the animal's weight and compares it to the array of weights stored on the tangible storage medium 612, determines which weight in the array is closest to the determined weight, and retrieves the animal's identification associated with the closest weight stored on the tangible storage medium 612. The local display 616 can be implemented in a variety of ways, similarly to the display of block 218 on FIG. 2. In addition, any wireless device with its own display, such as a mobile phone, a smartphone, a laptop, desktop or a tablet computer, can serve as a local display. In one exemplary implementation, the controller 610 sends data to the wireless device via the network adapter 622. The controller 610 controls the local display by sending various data and control words to the local display 616 to configure it to display the data in a desired fashion set by the control words. The local buttons 618 can be implemented in a variety of ways and can include, but are not limited to, various input mechanisms, such as for example, buttons, switches, and/or touch inputs. The controller 610 can accept the input electrical signal for the local buttons 618. The visible and audible alarms 620 can be implemented in a variety of ways and can include, but are not limited to, various visible alarms, such as for example a Liquid Crystal Display (LCD), Light-Emitting Diode (LED), Organic Light-Emitting Diode (OLED), Vacuum Fluorescent Display (VFD) and/or a combination thereof; and various audible alarms, such as for example a speaker, a piezo device, and/or a combination thereof. The controller 610 can control the visible and audible alarms 620 by sending data and, in some implementations, control words, at a desired sequence and timing. The network adapter 622 can be configured to connect the local device 601 with the network 624, and can be implemented in a variety of ways including, but not limited to, wireless adapters such as IEEE 802.11x (802.11a, 802.11b, 802.11g, 802.11n) also known as Wi-Fi also known as Wireless LAN (WLAN), IEEE 802.15 also known as Wireless Personal Area Network (Wireless PAN or WPAN), IEEE 802.15.1 also known as Bluetooth, IEEE 802.15.3 also known as High Rate Wireless Personal Area Network (HR-WPAN), IEEE 802.15.4 also known as Low Rate Wireless Personal Area Network (LR-WPAN) and their variety such as ZigBee, MiWi, Wireless Highly Addressable Remote Transducer (Wireless HART), Wireless Universal Serial Bus (Wireless USB), a cellular modem such as General Packet Radio Service (GPRS) or Code Division Multiple Access (CDMA) modem, or wired adapters, such as IEEE 802.3 Ethernet, Universal Serial Bus (USB) or IEEE 1394 also known as FireWire, and/or a combination thereof. The network 624 can be implemented in a variety of ways including, but not limited to, the Internet, the World Wide Web, peer-to-peer network, mash network and/or a combination thereof.

Figure 7:
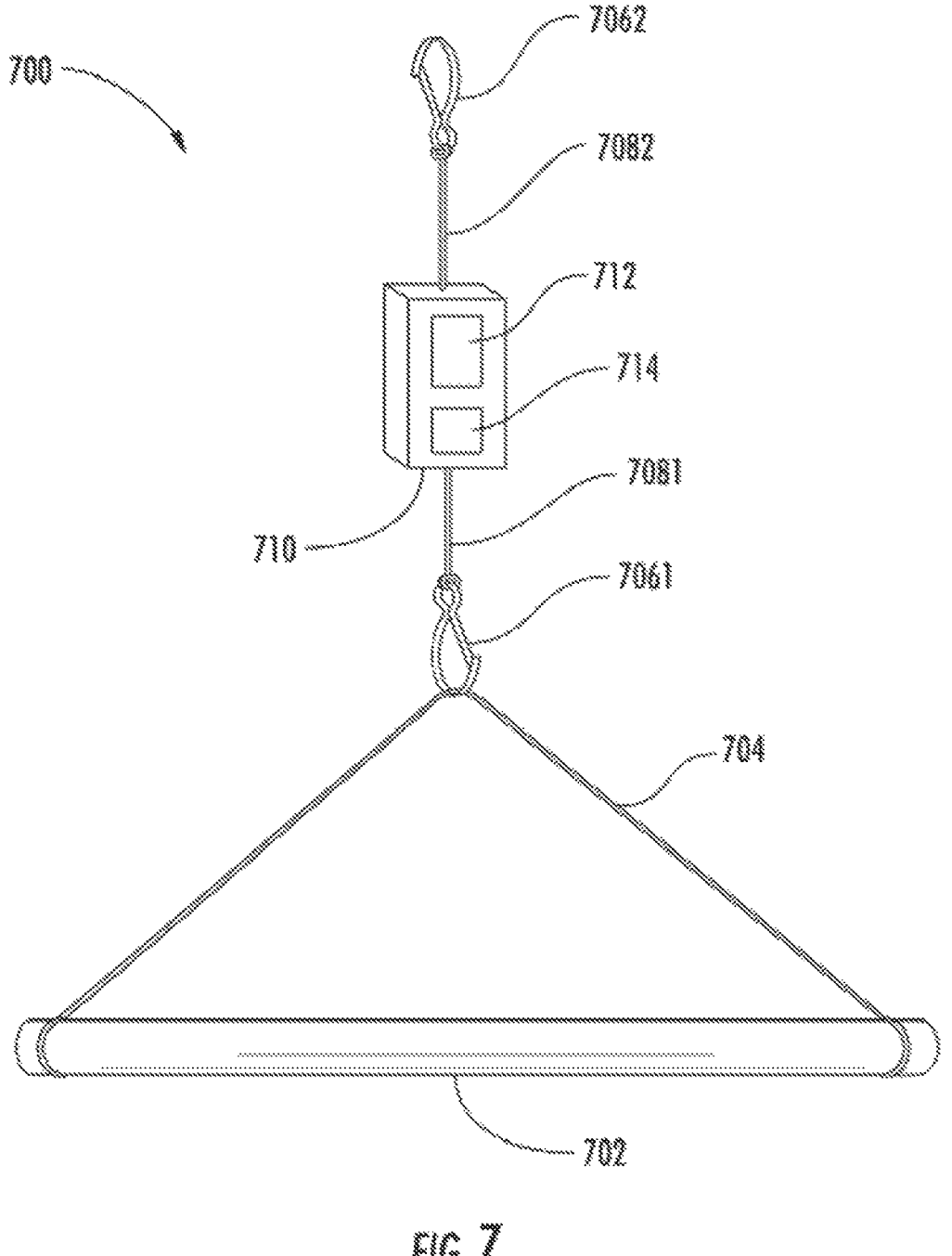
FIG. 7 is a graphical illustration of an exemplary animal behavior, health, and/or characteristics monitoring system comprising a kabob and weighing scale, according to one embodiment of the present disclosure.

FIG. 7 is a block diagram illustrating another exemplary system for monitoring behavior, health, and/or characteristics of an animal, according to one embodiment of the present disclosure, applicable to automatic monitoring of weight of avian animals (birds). An automatic system for monitoring of weight of avian animals (birds) 700, according to one embodiment of the present disclosure, comprises a kabob or perch 702, supported by a rope or a wire 704 that is connected to both ends of the kabob or perch 702. The rope or a wire 704 is hooked through a carabiner clip or a ring 7061 that is also connected to one side of a rope or wire 7081, while the other side of the rope or a wire 7081 is connected to the bottom side of the body of a device with weighing and time measurement capabilities 710. The upper side of the body of the device with weighing and time measurement capabilities 710 is connected to another rope or a wire 7082 that can be similar to the rope or a wire 7081. The other side of the rope or a wire 7082 is connected to a carabiner clip or a ring 7062 that can be similar to the carabiner clip or a ring 7061. The carabiner clip or a ring 7062 serves to connect the system 700 to a ceiling, an avian cage, a branch of a tree or any other suitable structure. Both rope or a wire 7081 and 7082, or either one 7081 or 7082 can have an antenna embedded into them for a wireless communication from the device with weighing and time measurement capabilities 710. The device 710 can be configured to measure and/or determine one or more characteristics of the avian animal (bird), while the avian animal (bird) is disposed on the kabob or perch 702. In some implementations, the device 710 is adapted to detect a weight change event, measure and record weight, date, time and duration of the event, and transfer these measured characteristics of the avian animal (bird) wirelessly. The device 710 is configured and operates similarly to the device 200 described above and shown on FIG. 2.

Figure 8:
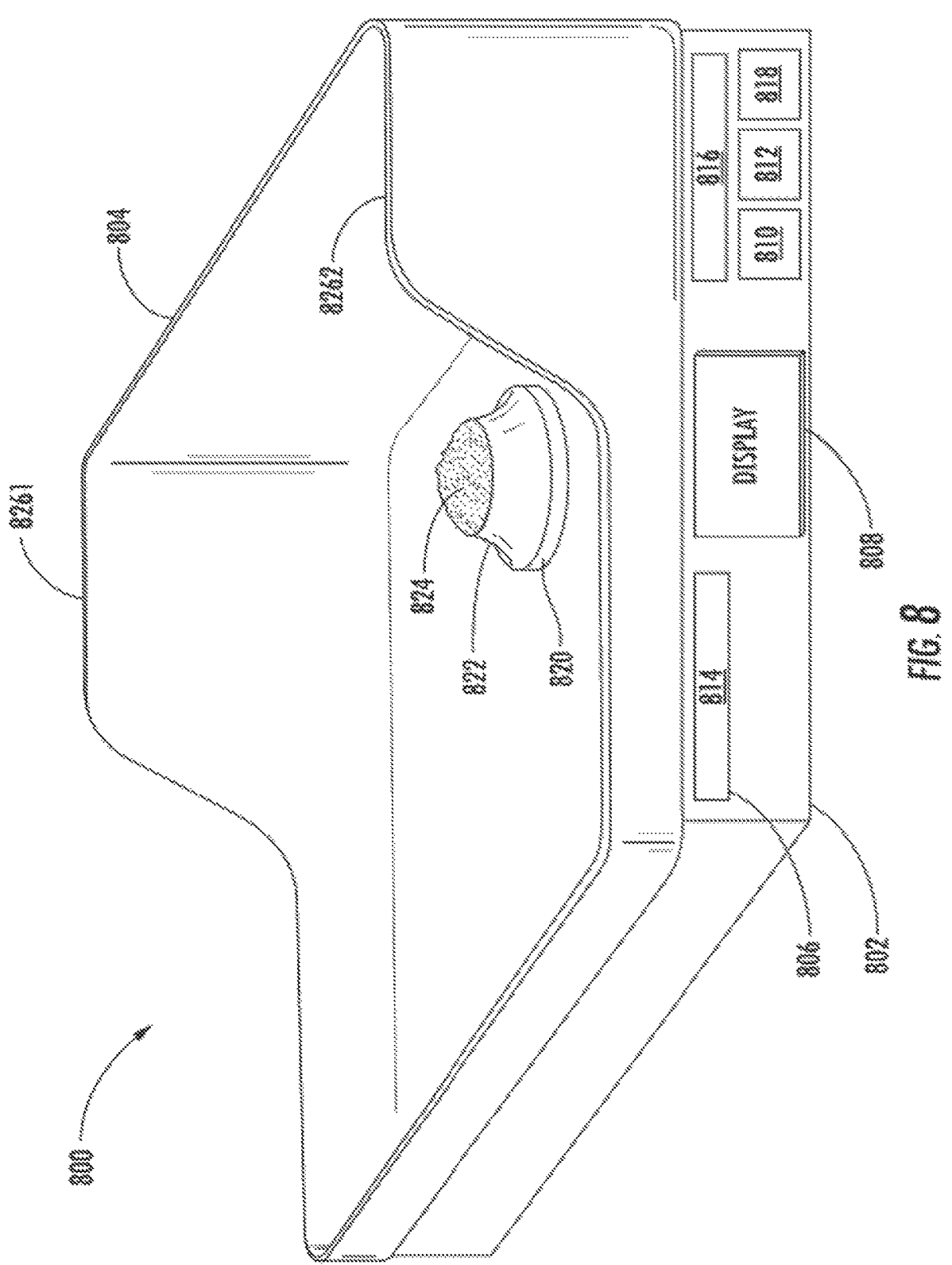
FIG. 8 is a graphical illustration of an exemplary animal behavior, health, and/or characteristics monitoring system comprising a weighing scale and a feeding and water station, according to one embodiment of the present disclosure.

FIG. 8 is a graphical illustration of system for monitoring behavior, health, and/or characteristics of an animal comprising a weighing scale and a feeding and water station, according to one embodiment of the present disclosure. An exemplary implementation compatible with any animal that uses a feeding and water station regularly, periodically or occasionally is shown in FIG. 8. In FIG. 8, the system 800 comprises a device 802 configured to measure and/or determine one or more characteristics of the animal, while the animal is disposed within a feeding tray 804. The animal is either attracted by a smell of food 824, placed inside a food bowl 822, or by the previous knowledge of the location of food and water on the feeding tray 804, or by a call of animal's owner or caretaker. The feeding tray 804 is specifically designed to prevent the animal from reaching a food or a water with its high raised left side 8261 and right side 8262, when a food or a water bowl 822 or both are placed close by the high raised back wall of the feeding tray 804; the animal has to approach the food and/or water from the side of low raised walls of the tray, and the animal is naturally funneled onto the tray's surface to reach the food and/or water, until all animal's paws are on the surface of the feeding tray 804. In one embodiment, the dimensions of the feeding tray 804 allow for only one animal at a time to be located on the surface of said tray. Such construction of the tray allows measurement of the animal's weight reliably while the animal is feeding and/or drinking water and has all its paws on the top surface of the feeding tray 804. In this implementation, the feeding tray 804 can also contain pieces of food and droplets of water that are naturally dispersed by an eating or water drinking animal. After the animal leaves the feeding station it is easy for the animal's owner or caretaker to clean up or wash up smooth internal surfaces of the feeding tray 804.

In some implementations, the device 802 comprises a weight scale 806 (electronic or mechanical) coupled to a digitized readout apparatus 808 that is coupled to a processor 810. In other implementations, the weight scale 806 is directly coupled to the processor 810 via a digital interface (not shown). In some implementations, the device 802 also includes a nonvolatile storage device 812 configured to store raw measurements and (in some variants) health parameters computed by the processor 810. In some implementations, the device 802 is adapted to detect a weight change event, measure and record weight, date, time and duration of the event. In some variants, the scale 806 comprises a top surface that is configured beneath the feeding tray 804.

In some variants, the feeding tray 804 is secured to the scale 806 via any of the variety of appropriate attachment mechanisms, including, for example, an anti-slip surface, a mechanical latch, a tongue and groove configuration, an adhesive, locking, wedging, suction, fastening such as a hook-and-loop fastener (also known under a brand name Velcro), etc., in order to prevent feeding tray movements relative to the scale, particularly when the animal is in contact with the feeding tray.

In some implementations, the scale 806 comprises an adaptor (not shown) configured to accommodate a variety of feeding tray sizes (and shapes), as may be required in order to handle animals of various sizes. In one variant, the adapter comprises an expandable plate arrangement that is similar to a common dining table. In another variant, the adapter comprises a removable plate, configured to conform to the shape of the feeding tray 804. In some implementations, the feeding tray 804 comprises the device 802, such that the device 802 is an integral part of the feeding tray 804, and such that the bottom of the feeding tray 804 serves as the top surface of the device 802 and vice versa.

In some implementations, the processor 810 comprises any suitable microcontroller, such as, for example a Texas Instruments MSP430, Stellaris ARM Cortex—M, C8000, Hercules ARM Microcontrollers; Renesas 78K, RX, H8, M16C, SH Microcontrollers; Atmel AVR, 8051, ARM7, ARMS, Cortex-M3 Microcontrollers; STMicroelectronics ARM Cortex, STM8, STM32 Microcontrollers; Freescale Kinetis ARM Microcontrollers. In some implementations, the processing block is embedded within the electronic scale (e.g., the scale 806).

The processor 810 can be configured to perform a variety of monitoring and processing operations comprising, inter alia, implementation of a state machine, control of digital inputs and outputs, read-out, analog-to-digital converters, which convert analog sensor outputs to digital words, and, optionally, processing of the digital words, various calibrations of device 802 and its subsystems: scale 806, sensor 814, and a measuring device 816, control of the input/output block (e.g. a network interface, a network adapter, a display), communicating (via the network interface) raw and/or processed data to a remote network entity, timer block implementation and interface (using for example a real time clock and processing the real time clock to compute current date and time), transfer of the raw real time clock reading or date and time to the network entity, display control and interface with the display and transferring of data to be displayed on the display, interfacing with buttons, as well as other monitoring and processing operations. The processing of the digital words can be a combination of or any of an IIR filter, FIR filter, window averaging or peak removal filters.

The weight scale 806 can include a sensor 814 and a measuring device 816. The sensor 814 can be configured for detecting the presence (including the absence) of the animal. The measuring device 816 can be configured to measure a characteristic of the animal whenever the presence of the animal is detected. In this case, the measuring device 816 can be configured to measure the weight of the animal in the feeding tray and output electrical signals representing a weight applied to the sensor 814.

The sensor 814 can comprise weighing scales, weight transducers, force transducers, displacement transducers, pressure transducers, weight sensors, force sensors, displacement sensors, and pressure sensors, among other sensors. In fact various pressure, force, displacement or weight sensor can be used, such as strain gauge-based load cells, optical position sensors, piezo displacement and pressure sensors; various types of load cells can also be used, such as single point, planar beam, tension or compression. The sensor 814 can also comprise photographic cameras, video cameras, camcorders, contact thermometers, non-contact thermometers, such as infrared thermometers, laser thermometers, infrared pyrometers, laser pyrometers, and a combination thereof. Various auxiliary means to determine animal's presence or absence at a particular location or height, such as optical sensors, optical reflecting sensors, LED/photodiode pair optical sensors, LED/phototransistor pair optical sensors, laser diode/photodiode pair optical sensors, laser diode/phototransistor pair optical sensors, optocouplers, optical fiber coupled optical sensors, magnetic sensors, weight sensors, force sensors, displacement sensors, pressure sensors, various proximity sensors, such as inductive proximity sensors, magnetic proximity sensors, capacitive proximity sensors, and a combination thereof can also be used. The measuring device 816 can be used in combination with the sensor 814 to determine the animal's presence or absence.

In one implementation, the device 800 further comprises an interface block 818, coupled to the processor 810. In some variants, the interface block 818 comprises a display, such as, for example a Liquid Crystal Display (LCD), Light-Emitting Diode (LED), Organic Light-Emitting Diode (OLED), Vacuum Fluorescent Display (VFD). In another variant, the interface block 118 comprises a digital serial interface such as, for example an Universal Serial Bus (USB), Universal Asynchronous Receiver/Transmitter (UART) or Universal Synchronous/Asynchronous Receiver/Transmitter (USART) that is used in conjunction with communication standards such as RS-422, RS-485 or RS-232, or IEEE 802.3 Ethernet. In another variant, the interface 114 comprises any suitable wireless interface, such as IEEE 802.11x (802.11a, 802.11b, 802.11g, 802.11n) also known as Wi-Fi also known as Wireless LAN (WLAN), IEEE 802.15 also known as Wireless Personal Area Network (Wireless PAN or WPAN), IEEE 802.15.1 also known as Bluetooth, IEEE 802.15.3 also known as High Rate Wireless Personal Area Network (HR-WPAN), IEEE 802.15.4 also known as Low Rate Wireless Personal Area Network (LR-WPAN) and their variety such as ZigBee, MiWi, Wireless Highly Addressable Remote Transducer (Wireless HART), Wireless Universal Serial Bus (Wireless USB). In another variant, the interface block 818 comprises a cellular modem or a cellular network adapter such as General Packet Radio Service (GPRS), GSM (Global System for Mobile Communications, originally Groupe Special Mobile), or Code Division Multiple Access (CDMA), and the processor 810 is implemented as a part of the modem. In some implementations the interface block 818 comprises input means, such as for example, buttons or switches.

In some implementations, the nonvolatile storage device 812 is configured as an integral part of the processor 810. In other implementations, the storage device 812 is embodied within the weight scale 806. In other implementations, the storage device 812 is embodied within the interface block 818. In other implementations, the storage device 812 comprises a flash storage module (fixed or removable), or any other suitable non-volatile recording media module (optical, magnetic, etc.), operably coupled to the processor 810.

In one exemplary implementation, the device 800 comprises a single housing encompassing a weight scale 806, the processor 810, and the storage block 812. In some variants, the device 800 further comprises a wireless input/output interface (e.g., the interface block 818). A feeding tray 804 is disposed on top of the device 800 using any of the mechanisms described herein, or houses the entire device 802 as described herein.

In another implementation, the device 800 comprises a weight scale module and input/output interface module. In one implementation, the electronic scale module houses the processor and wireless network interface, comprising, e.g., a portion of the interface block 818 of FIG. 2. In one variant, the device 800 is coupled to the input/output module via a digital wired interface (e.g., serial, USB, Ethernet, I2C, or any other applicable interface). In other variants, the input/output interface module is connected to the device 800 via a wireless interface (e.g., WiFi, IR-DA, Bluetooth, etc.). In still another variant, the input/output interface module is connected to the device via the wireless interface. In one variant, the input/output interface module comprises a display unit and input interface (e.g., the buttons). In other variants, the display unit comprises a touch sensitive interface thereby providing input functionality. In another variant (not shown), the display unit comprises LED. In another implementation, the processor and wireless network interface are embodied within the input/output module.

In some variants, the nonvolatile storage 812 is embodied within the input/output module. In other variants, the input/output module comprises an interface configured to receive a removable nonvolatile storage module (e.g., a USB flash drive, secure digital card, or a memory stick).

In some implementations, a device 820 can be placed underneath a food bowl or a water bowl, or two devices 820 can be placed underneath a food and a water bowl respectively. The device 820 is functionally and operationally similar to the device 802, with the exception of its form factor. In the implementations where the device 820 is used, it captures a weight over time profile of a food or water bowl. The profile can represent a pattern of food or water consumption by an animal.

In locations (e.g. households, veterinary hospitals) where multiple animals share the use of the feeding station, each animal can be identified by its weight, weight pattern, food and/or water consumption patterns, as described herein. Exemplary embodiments of a system for monitoring the behavior, health and/or characteristics of an animal can be adapted for use with a plurality of animals. In one exemplary embodiment, the animals use the same waste container. In such an embodiment, an identification sensor configured to identify each separate animal is included in the system. The identification sensor can comprise a weight scale configured to determine an animal's weight, a Radio Frequency Identification (RFID), a barcode, a picture of an animal, a video recording of an animal, and/or a combination thereof. In one exemplary embodiment, an RFID reader is used to read RFID tags attached to the animals or RFID chips implanted into animals' bodies. In another embodiment, the animal's weight is used as its ID. In case there are multiple animals using the same waste container, the system can track the animals by their weight. For example, each animals' weights can be determined and recorded during the first time the animal uses the waste container following the system installation and activation. If multiple animals use the same waste container and at least two have body weight values equivalent or close enough to each other, it can be difficult to ID each animal separately. Embodiments of the present disclosure provide other mechanisms and methods for users to enter ID's and weight for each of the separate animals.

Figure 9:
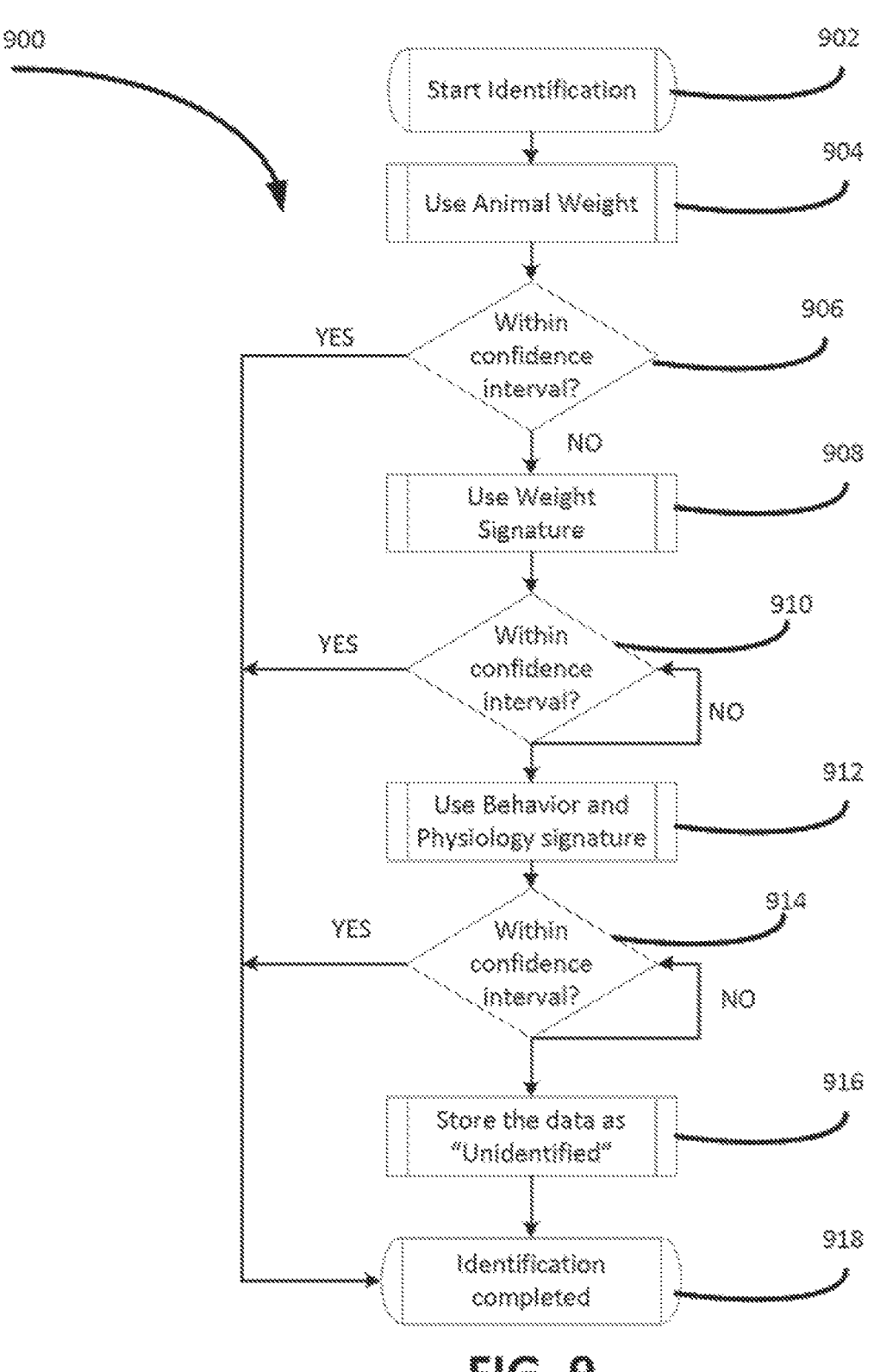
FIG. 9 is a logical flow-chart illustrating one exemplary method for identifying a specific animal from a plurality of animals, according one embodiment of the present disclosure.

FIG. 9 is a logical flowchart illustrating one exemplary method for identifying each animal, or at least distinguishing between animals in a multiple-animal environment, according to one embodiment of the present disclosure. The methodology described herein is compatible with any animal that uses a waste container for emptying its bowels, bladder and a combination thereof regularly, periodically or occasionally; with any animal that uses a food tray to feed and/or drink water regularly, periodically or occasionally; and/or with any animal that uses an animal bed regularly, periodically or occasionally.

At step 902 of the method 900 of FIG. 9, the animal already stepped off a waste container or a food tray or a bed, and the measured characteristics of the animal has been stored by the system. At step 904, an attempt to identify an animal takes place based on the most recent measurement of animal's weight, which is being compared to previously measured weights of all animals associated with this particular multiple-animal environment. There can be many various methods to perform such comparison and identify the closest weight. In on variant, after the comparison is complete, the difference between the current animal's weight and the closest previously measured weight value is calculated as a percent of the closest previously measured weight value. The method proceeds to step 906 where the calculated percentage is compared with a confidence interval, previously defined by the algorithm. There can be many various methods for defining such a confidence interval. In one variant, the confidence interval is defined between zero percent and a maximum percent calculated over the course of the past 7 days. If the calculated percentage falls within the confidence interval, the animal is identified as the animal associated with the previously measured weight. The most recent measurement of the animal's weight is stored in place of the previously measured weight, to be used in step 902 the next time method 900 is applied. Finally, identification is completed in step 918.

If, however, the calculated percentage falls outside of confidence interval, the method proceeds to step 908, where the animal's body weight signature is used. There can be many various methods to build a body weight signature. In one variant, a number of past weight measurements for the animal associated with the previously measured weight can be used, along with the date and time of each of the past weight measurements. The number of past weight measurements used can vary but preferably is high enough to perform a successful polynomial extrapolation. In one variant, 100 past weight measurements can be used to perform a polynomial extrapolation to the point in time when the current weight measurement in question occurred, and the weight value extrapolated can now be compared with the current weight measurement in question. The method proceeds to step 910 which is similar to step 906 described herein; if the calculated percent falls within a confidence interval, the animal is identified as the animal associated with the 100 past weight measurements and the identification ends by jumping to step 918.

If, however, the calculated percentage falls outside of confidence interval, the method repeats step 910 using the next closest previously measured weight, associated with a different animal. In repeating step 910, a polynomial extrapolation is performed based on, for example, the 100 past weight measurements for another animal. If repeating step 910 a second time still falls outside of the confidence interval, the method proceeds to step 912 and uses the animal's behavior and physiology signature to attempt to identify the animal. There can be many various methods for generating an animal's behavior and physiology signature. Such signatures can be generated based on the animal's measured characteristics, which, in turn, depend on whether the method is applied on a measured characteristic associated with a waste container, a food/water tray, an animal's bed, or another embodiment of the present disclosure. In one variant associated with a waste container, number of polynomial extrapolations take place based on the following measured characteristics: 100 past animal weight measurements and date and time associated with each measurement, 100 past waste weight measurements and date and time associated with each measurement, 100 durations of time spent by the animal in the waste container and date and time associated with each measurement.

In another variant associated with a food/water tray, number of polynomial extrapolations take place based on the following measured characteristics: 100 past animal weight measurements and date and time associated with each measurement, 100 past measurements of food/water consumed and date and time associated with each measurement, 100 durations of time spent by the animal in the food/water tray and date and time associated with each measurement, 100 average rates of food/water consumptions calculations and date and time associated with each measurement/calculation.

In yet another variant associated with an animal's bed, number of polynomial extrapolations takes place based on the following measured characteristics: 100 past animal weight measurements and date and time associated with each measurement, 100 durations of time spent by the animal in the animal's bed and date and time associated with each measurement, 100 sleep quality ratings calculated and date and time associated with each measurement/calculation.

For each of the three variants described herein, the method proceeds to step 914, which is similar to step 910 described herein. If the calculated percent falls within a confidence interval, the animal is identified as the animal associated with the 100 past weight measurements and the method jumps to step 918. If, however, the calculated percentage falls outside of the confidence interval, the method stays at step 914 and uses the next closest previously measured weight, associated with a different animal, repeating step 914 by performing a polynomial extrapolation based on, for example, 100 past measurements for another animal, as described herein. If repeating step 914 second time still falls outside of the confidence interval, the method proceeds to step 916, where the animal is declared as "Unidentified" and the measured characteristics associated with this animal are all labeled as "Unidentified". Various expansion of step 916 are possible. In one variant, a message can be dispatched to the animal's owner or caretaker, and he/she can apply human intelligence in an attempt to associate the Unidentified measured characteristics with a particular animal.

In some exemplary case it is important to identify an animal before it steps off a waste container or a food tray or a bed, for various needs, such as the need to know the most recent activity of the animal in real time. In such case, the only measured characteristics that can be used is the currently measured weight of the animal, and the date and time of the current measurement. In this case, only steps 902, 904, 906, 908, 910, 916 and 918 are applicable, and steps 912 and 914 can be skipped. However, as the animal steps off a waste container or a food tray or a bed, and if step 918 is not reached, i.e. if the method is in step 916, the method returns to step 912.

Figure 10:
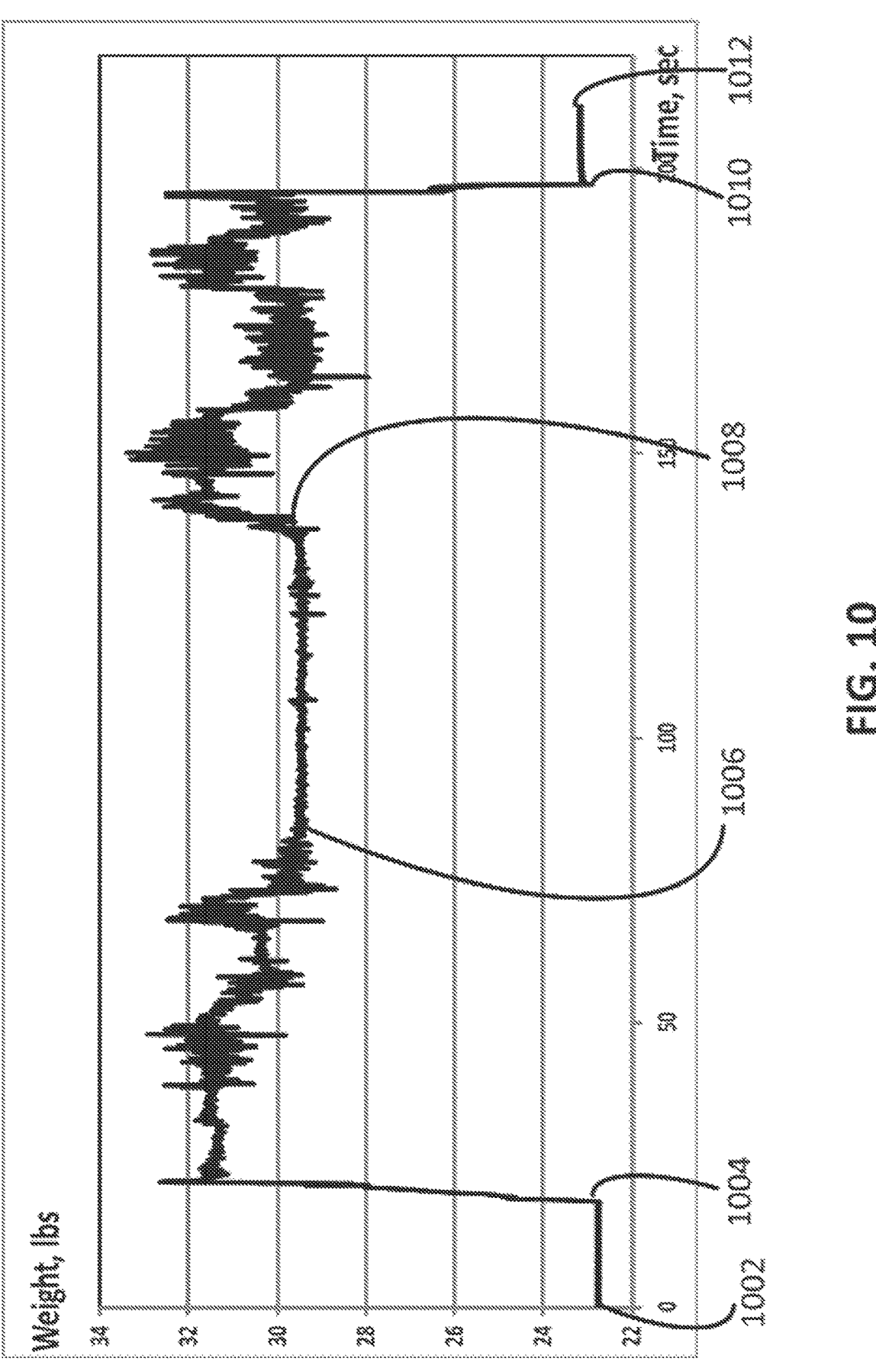
FIG. 10 is a graphical representation of exemplary measured characteristics and derived data, according to one embodiment of the present disclosure.

FIG. 10 is a chart of exemplary sample data collected in accordance with various embodiments of the present disclosure. In this example, the exemplary data corresponds to an embodiment in which a system according to the present disclosure is used in connection with a weighing scale and waste container being used by a typical house cat. In this sample situation, data is captured by an analog-to-digital converter from a force-to-analog electrical signal transducer (a load cell=strain gauge mounted on a mechanical spring), transformed by the processor from a binary number to weight in pounds. This sample data can be used to illustrate some of the measured characteristics and derived data discussed and described herein. In this example, the weight of the waste container before the animal stepped in the container was approximately 22.7 lbs. (see point 1002). The cat entered the waste container at approximate the 16 second mark (point 1004) and stepped out of the waste container box at approximately the 197 second mark (point 1010). From this, the processor can calculate that the animal stayed in the waste container for approximately 181 seconds (197–16=181 sec=3 min). The combined weight of the animal and waste container was measured, once the sensors stabilized between the 85 second and 117 second marks (points 1006 and 1008, respectively), as 29.4 lbs. From this, the animal's weight can be calculated as 6.7 lbs. (29.4–22.7–[compensation for creep]=6.7 lbs–[compensation for creep]). The weight of the waste container after the animal stepped out of the waste container was measured as approximately 23.1 lbs. (at point 1012). From this, the weight of the waste can be calculated as approximately 0.4 lbs (23.1–22.7–[compensation for creep]=0.4 lbs–[compensation for creep]=0.4 lbs–0.00151 bs/s*180 sec=0.4–0.27=0.13 lb=~2 oz).

Embodiments of the present disclosure may also be used to enable animals' owners and caretakers (hereafter "users") to create online accounts. The system can be configured so that users can create personal accounts for themselves and, under their account, accounts for each animal in the user's ownership.

In one embodiment, owners and caretakers of animals of similar characteristics, including, but not limited to species, breed, gender, age or range of ages, geographical location, and/or a combination thereof, can be introduced to each other online. As soon as a new user is in the process of creating a user account and entering the animal information as described herein, the algorithms can be configured to search the database for users with animals of similar characteristics, and offer the new user the opportunity to befriend the users with animals of similar characteristics. The new user can be given the choice of accepting all of these friend suggestions or the new user can narrow down the friend suggestions to a reduced set, based on wider set of characteristics as described herein, up to rejecting all friend suggestions. The new user can be given the option of whether or not they receive these friend suggestions. One benefit of befriending other system users is the sharing observation, questions, comments, and/or concerns based on the measured characteristics and derived data of their animals, and furthermore, if desired, sharing the actual measured characteristics and derived data with other users.

In various embodiments, users can be given the option of setting up a personal page for themselves, and for their animal or animals including various media, such as, but not limited to pictures, videos, audios, blogs, posts, comments, and/or a combination thereof. In other embodiments, users can be allowed to post comments on pages of other users related to their animals or any other topic, and rate pictures, videos, blogs and other types of media posted on a users' personal page.

In another embodiment, users receive electronic mail notifications when other users visit their page and post a comment or rate pictures, videos, blogs and other types of media posted on users' personal page; users will be enabled to designate their pages as "public" to allow any user access said pages, as "friends only" to allow only users who befriended them to assess said pages, or as "private" to not allow any user to assess said pages.

In another embodiment, a public forum is available to registered user, where each user could start a new discussion or post a comment on existing discussion.

In another embodiment, users receive electronic mail updates about their personal account and bout their animal's account or animals' accounts. In this embodiment, said electronic mail updates are sent automatically, regularly and periodically, and a user can adjust the periodicity including, but not limited to, one time a year, one time every six, four, three or one months, one time every one or two weeks, one time every six, five, four, three, two or one days; or the user can disable said updates from being sent. In this embodiment, said electronic mail updates can include variety of information, including, but not limited to, statistical data on the animal's health, behavior and characteristics for the period of choice, such as averages, medians, maximums and minimums of the measured characteristics and derived data, information about changes, trends, variations in the measured characteristics and derived data, predictions, recommendations, and a combination thereof.

In another embodiment user provides information that allows to calculate exact or approximate age of an animal. Said information including, but not limited to, animal's date of birth or month and year of birth, animal's exact or approximate age in year, months, week, days, animal's date of adoption and exact or approximate age at the time of the adoption, animal's species, breed, gender, or a combination thereof. In this embodiment, an actual growth chart of the animal is generated as animal's weight plotted against date of measurement, and said actual growth chart of the animal is superimposed with an ideal growth chart of an animal of same species, breed and gender, as provided by veterinarians or scientists; said ideal growth chart shows recommended boundaries as a chart of the minimum and the maximum weight at each animal's age from birth until approximately 48 weeks of age. In this embodiment, the user can elect to receive automated alerts in various conditions, including, but not limited to, changes, trends or variations in the actual growth rate of the animal, deviation of the actual growth rate of the animal from said ideal growth rate of an animal of same species, breed and gender, actual weight of the animal approaching or exceeding maximum recommended weight of an animal of same species, breed and gender at the animal's age, actual weight of the animal approaching or dropping below minimum recommended weight of an animal of same species, breed and gender at the animal's age, and a combination thereof.

In another embodiment, user can create, write, upload custom labels, notes, or pictures, and assign them to a particular date. In one example, if a user switched the animal to new diet on May 18, 2012, the user writes a note "Gracie started on Royal Canin Ultra Light" and assigns the "May 18, 2012" date in any acceptable date format. In this example, the note serves as a tracking point to assess animal's physiological, behavioral, health or characteristic changes following switching the animal to a different food. In another example, the animal can be switched to a different food regiment, while continuing consuming same food. In this example, the user can elect to set up a specific alert about animal's body weight changes, including, but not limited to, the animal's body weight dropping below the minimum or exceeding the maximum weight boundaries expressed in an absolute weight in any weight units, such as kilograms, grams, pounds, ounces, or a combination thereof, or expressed in a relative weight changes in any weight units as described herein, for example "+3 oz." or "−1 oz.", or expressed in a relative weight changes in percent of the current animal's weight, for example "+7%" or "−5%". Accordingly as depicted in this example, if the animal's body weight drops below specified minimum or exceeds specified maximum, an automated notification is dispatched to as an electronic mail to a user-specified electronic mail address, or as a text SMS to a user-specified mobile phone number.

In another embodiment, user can set up an automatic notification as described herein, based on lack of specified animal's activity, including, but not limited to, the animal has not been present in a waste container for a user-specified number of hours, the animal has not been present on a food tray for a user-specified number of hours, the animal has not been present on an animal's bed for a user-specified number of hours, and a combination thereof. In this embodiment, an automated notification is dispatched as described herein, if a user-specified number of hours passed since the most recent animal's presence has been detected in a waste container, on a food tray or on an animal bed.

In another embodiment, user can create a custom greeting message from its animal/s and/or custom signature, such that every alert, notification or periodic update sent to the user will have a customized greeting message and/or will be signed by the user's animal. One example of such communication is: "Dear mommy, this is me, Munchkin, I just wanted to let you know that I'm doing well. In the past I gained 0.25 lbs in my body weight, thanks so much for feeding me so well. Love you, Your Munchkin".

In another embodiment, a custom greeting message from user's animal/s and/or custom signature are automatically generated based on the information on user's name and user animal's or animals' name/s or nickname/s, such that every alert, notification or periodic update sent to the user will have a customized greeting message and/or will be signed by the user's animal. One example of such communication is: "Dear mommy, this is me, Munchkin, I just wanted to let you know that I'm doing well. In the past I gained 0.25 lbs in my body weight, thanks so much for feeding me so well. Love you, Your Munchkin"

In another embodiment, an animal activity summary can be presented to a user on a remote display, including, but not limited to, a waste container activity, a food and/or water tray activity, an animal bed activity. In one example, an animal activity summary can be presented in three columns, where first column represents average of animal's activity over a period of past user-specified number of days, second column represents animal's activity yesterday, and third column represents animal's activity today.

In another embodiment, a recuperation of a sick animal undergoing a veterinarian treatment can be monitored, including, but not limited to, monitoring animal's activity, measured characteristics and derived data associated with a waste container, a food and/or water tray, an animal bed. In one example, if an animal's behavior, health, and/or characteristics have been monitored while the animal was healthy before the animal became sick, animal's typical profile of healthy behavior, health, and/or characteristics can be defined as a target, and a progress of animal's recuperation can be gauged against said target. Furthermore, in this example if the improvement in the animal's behavior, health, and/or characteristics is too slow, slowing down, or stalled, an alert can be dispatched automatically as described herein to specified users, such as current user—animal's owner or caretaker, or user-specified additional individuals, such as treating veterinarian or veterinarian technician.

In another embodiment, in a particular case of senior or geriatric animal/s, such as animal/s who reached or exceeded a specified age, a sensitivity of threshold for sending an alert or alerts can be adjusted by the user.

Embodiments of the present disclosure may be used to automatically and continuously measure animal activity characteristics, using an apparatus attached to animal's body in various ways, such as a neck collar, breast collar, ribcage collar, or tack. In some embodiments, said apparatus can comprise variety of sensors, including, but not limited to a 1-axis, 2-axis or 3-axis accelerometer, a location device, such as a GPS (Global Positioning System) device, a gyroscope, an inertial sensor, or a combination thereof.

In one embodiment, a 3-axis accelerometer that can reliably and accurately detect and measure acceleration, tilt, shock and vibration associated with animal's body is used to measure characteristics of an animal including, but not limited to, acceleration, tilt, shock and vibration on each of the three axes of the accelerometer. In one example, the acceleration data for each axis can be an array of digital data representing time intervals between consecutive peaks of acceleration paired with the absolute or relative value of each peak of acceleration. In another example, the acceleration data for each axis can be an array of digital data representing absolute or relative value of acceleration for this axis, measured at a constant known time interval. In both examples, the date and time of at least one data point is known, and therefore the date and time of measuring each data point can be derived mathematically. In one embodiment, measured characteristics are processed to derive data to generate animal's body motion profile, including but not limited to, calculating speed, acceleration, and deceleration, and identifying when, how many times and how strong the animal jumps in the air, or a combination thereof. Based on the derived data in this embodiment, an animal activity score is calculated for a period of time that can be a 24 hours period or any period specified by a user, including, but not limited to, total cumulative amount of energy spent on an absolute scale, if animal's body weight is known, or on a relative scale, assuming an animal's body weight of one relative unit, total distance covered by the animal, total time in motion, distance and time the animal ran, distance and time the animal walked, distance and time the animal rested, number of times the animal jumped in the air, total activity score based on the parameters listed herein, and a combination thereof. In another embodiment, mathematical algorithms create a typical profile of animal activity over time, identify atypical changes or trends in animal activity, and automatically alert animal owner or caretaker. In another embodiment, mathematical algorithms identify animal's walking and running styles and animal health issues related to animal activity such as walking, running, jumping and resting.

In another embodiment, an automated or user-assisted-automated method for identifying or at least distinguishing between animal's activity types in a waste container, namely identifying or at least distinguishing between animal urinating and animal defecating inside a waste container. In one embodiment, various measured characteristics and derived data are used, including, but not limited to, weight of waste deposited by an animal in a waste container, duration of time an animal was present inside a waste container, pattern of animal's activity at a given presence inside a waste container, namely sequence, time duration and number of each active period, when an animal was moving inside a waste container, and of each still period, when an animal was relatively still inside a waste container, intensity of animal's activity inside a waste container, time of day of each animal's presence in a waste container, knowledge about previous and the preceding animal's presences in a waste container, weight of waste removed by an animal's owner or caretaker from a waste container while cleaning the waste container by removing animal's waste, user-provided information about most recent animal's presence in a waste container-whether the animal urinated or defecated or both urinated and defecated during animal's most recent presence in a waste container, or a combination thereof. In one example, a distinction between animal moving inside a waste container or staying relatively still inside a waste container can be made by comparing a peak-to-peak amplitude of a signal from a sensor or a weighing scale with a predefined threshold: if said peak-to-peak amplitude is consistently below said threshold for a continuous period of time, such period of time is defined as relatively still, otherwise such period of time is defined as active. In this example, the intensity of animal's activity inside a waste container can be defined as the cumulative of amplitudes expressed as a digital sum of digital words, representing value of weight, force or pressure applied by the animal or resulting acceleration of a waste container's bottom surface. It can be noted that the intensity of animal's activity inside a waste container varies depending on the type of activity. In another example, the method can learn and adapt using various adaptive algorithms and base its decision on a previous knowledge. For example, if a healthy animal typically defecates one time a day typically in early morning and urinates 2-5 times a day, the likelihood of the animal defecating on the afternoon of a day when defecation was identified in the morning is low. Also for example, if a user provided information that the most recent animal's presence in a waste container was urination-related, the pattern of animal's behavior at said presence can be stored as a template for urination and used in a future to compare patterns of animal's presence in the waste container with said template and make decisions based on a defined threshold. In another example, if the weight of most recently deposited waste by the animal is approximately equal to the weight of waste removed by an animal's owner or caretaker from a waste container while cleaning the waste container, the method can conclude that the fecal matter was removed; however, if the weight of most recently deposited waste by the animal is approximately 1.5-4 times lower than the weight of the waste removed by an animal's owner or caretaker from a waste container while cleaning the waste container, the method can conclude that the urine was removed with some mount of litter that clumped because of liquid urine.

In another embodiment, an automated method can detect various animal conditions and/or diseases early, based on measured characteristics and derived data, alert animal owner or caretaker with a description of a suspected condition and list of potential diseases that match some of detected symptoms. For example, some of the symptoms of a disease known as hyperthyroidism are weight loss in older animals, increase in frequency of trips to the waste container, increase in food and water consumption and accordingly, increase in daily cumulative weight of waste. All of the symptoms listed herein can be detected by the automated method. In another example, general symptoms of diarrhea are increase in frequency of trips to a waste container, higher than usual variability in weight of waste deposited in every trip to the waste container, variability in an activity pattern inside a waste container. In another example, general symptoms of feline lower urinary tract disease are variability in any or all of the following: frequency of trips to the waste container, irregularity of the trips to the waste container, duration of time spent inside the waste container, activity pattern inside a waste container, unusually low weight of waste (urine) deposited in every trip to the waste container. In another example, general signs of diabetes are increase in food and water consumption, increase in frequency of trips to the waste container, and weight loss.

It will be recognized that while certain aspects of the present disclosure are described in terms of a specific sequence of steps of a method, these descriptions are only illustrative of the broader methods of the present disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure disclosed and claimed herein.

While the above detailed description has shown, described, and pointed out novel features of the present disclosure as applied to various embodiments, it will be understood that various omissions, substitutions, and changes in the form and details of the device or process illustrated may be made by those skilled in the art without departing from the present disclosure. The foregoing description is of the best mode presently contemplated of carrying out the present disclosure. This description is in no way meant to be limiting, but rather should be taken as illustrative of the general principles of the present disclosure. The scope of the present disclosure should be determined with reference to the claims.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present disclosure, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in a computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. Various embodiments may comprise a computer-readable medium including computer executable instructions which, when executed by a processor, cause an apparatus to perform the methods and processes described herein.

As used herein, the term module can describe a given unit of functionality that can be performed in accordance with one or more embodiments of the present disclosure. As used herein, a module might be implemented utilizing any form of hardware, software, or a combination thereof. For example, one or more processors, controllers, ASICs, PLAS, PALs, CPLDs, FPGAS, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of the present disclosure are implemented in whole or in part using software, in one embodiment, these software elements can be implemented to operate with a computing or processing module capable of carrying out the functionality described with respect thereto.

Furthermore, embodiments of the present disclosure may be implemented in software, hardware, application logic or a combination of software, hardware and application logic. The software, application logic and/or hardware may reside on a client device, a server or a network component. If desired, part of the software, application logic and/or hardware may reside on a client device, part of the software, application logic and/or hardware may reside on a server, and part of the software, application logic and/or hardware may reside on a network component. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. In one embodiment, the computer-readable storage medium is a non-transitory storage medium.

The invention claimed is:

1. A system for monitoring the behavior of an animal, the system comprising:
   a sensor configured to detect the presence of the animal;
   a measuring device configured to measure a characteristic of the animal whenever presence of the animal is detected;
   a storage device configured to store the measured characteristics of the animal; and
   a processor configured to calculate derived data from the measured characteristics,
   wherein the storage device is further configured to store threshold alert data and wherein the processor is configured to compare either the measured characteristic or derived data to the stored threshold alert data and to send an alert when the measured characteristic or derived data crosses the threshold alert data.

2. The system of claim 1, further comprising an identification sensor configured to identify the animal as a specific animal from a plurality animals after presence of the animal is detected.

3. The system of claim 1, wherein the measured characteristic is selected from the group consisting of:
   the animal's weight;
   the weight of the animal's waste;
   the weight of a platform before the presence of the animal was detected;
   the combined weight of the platform and the animal after the presence of the animal was detected;
   the weight of a platform after the departure of the animal was detected;
   the weight of the food consumed by the animal;
   the weight of the water consumed by the animal;
   the date when presence of the animal is detected;
   the time when presence of the animal is detected;

the time when departure of the animal is detected; and the duration of time between detection of the presence of the animal and the departure of the animal.

4. The system of claim 1, wherein the derived data is selected from the group consisting of:

the daily frequency with which presence of the animal is detected;

the cumulative daily weight of the animal's waste;

the cumulative daily weight of the food consumed by the animal;

the cumulative daily weight of the water consumed by the animal;

the average daily weight of the animal;

the maximum and the minimum daily weight of the animal;

the cumulative daily duration of time between each detection of the presence of the animal and the departure of the animal;

the average, maximum and minimum rates of food and water consumption, expressed in weight of food and water consumed per unit of time;

the cumulative daily number of times the presence of the animal is detected;

the amount of time since the last time presence of the animal is detected; and the average daily time interval between instances where presence of animal is detected.

5. The system of claim 1, wherein the sensor, measuring device, and storage device are assembled in a stand-alone apparatus.

6. The system of claim 1, wherein the processor is a remote cloud device.

7. A method for monitoring the behavior of an animal, the method comprising:

detecting the presence of the animal;

measuring a characteristic of the animal whenever presence of the animal is detected;

storing the measured characteristics of the animal;

calculating derived data from the measured characteristics; and comparing the measured characteristic and/or derived data to stored threshold alert data and sending an alert when the measured characteristic and/or derived data crosses the threshold alert data.

8. The method of claim 7, further comprising identifying the animal as a specific animal from a plurality of animals after presence of the animal is detected.

9. The method of claim 7, wherein the measured characteristic is selected from the group consisting of:

the animal's weight;

the weight of the animal's waste;

the weight of a platform before the presence of the animal was detected;

the combined weight of the platform and the animal after the presence of the animal was detected;

the weight of a platform after the departure of the animal was detected;

the weight of the food consumed by the animal;

the weight of the water consumed by the animal;

the date when presence of the animal is detected;

the time when presence of the animal is detected;

the time when departure of the animal is detected; and the duration of time between detection of the presence of the animal and the departure of the animal.

10. The method of claim 7, wherein the derived data is selected from the group consisting of:

the daily frequency with which presence of the animal is detected;

the cumulative daily weight of the animal's waste;

the cumulative daily weight of the food consumed by the animal;

the cumulative daily weight of the water consumed by the animal;

the average daily weight of the animal;

the maximum and the minimum daily weight of the animal;

the cumulative daily duration of time between each detection of the presence of the animal and the departure of the animal;

the average, maximum and minimum rates of food and water consumption, expressed in weight of food and water consumed per unit of time;

the cumulative daily number of times the presence of the animal is detected;

the amount of time since the last time presence of the animal is detected; and the average daily time interval between instances where presence of animal is detected.

11. A computer program product comprising a non-transitory computer-readable medium storing computer code executable by a processor, the computer program product comprising:

computer code for detecting the presence of an animal;

computer code for measuring a characteristic of the animal whenever presence of the animal is detected;

computer code for storing the measured characteristics of the animal;

computer code for calculating derived data from the measured characteristics; and computer code for comparing the measured characteristic and/or derived data to stored threshold alert data and for sending an alert when the measured characteristic and/or derived data crosses the threshold alert data.

12. The computer program product of claim 11, further comprising computer code for identifying the animal as a specific animal from a plurality animals after presence of the animal is detected.

13. The computer program product of claim 11, wherein the measured characteristic is selected from the group consisting of:

the animal's weight;

the weight of the animal's waste;

the weight of a platform before the presence of the animal was detected;

the combined weight of the platform and the animal after the presence of the animal was detected;

the weight of a platform after the departure of the animal was detected;

the weight of the food consumed by the animal;

the weight of the water consumed by the animal;

the date when presence of the animal is detected;

the time when presence of the animal is detected;

the time when departure of the animal is detected; and the duration of time between detection of the presence of the animal and the departure of the animal.

14. The computer program product of claim 11, wherein the derived data is selected from the group consisting of:

the daily frequency with which presence of the animal is detected;

the cumulative daily weight of the animal's waste;

the cumulative daily weight of the food consumed by the animal;

the cumulative daily weight of the water consumed by the animal;

the average daily weight of the animal;

the maximum and the minimum daily weight of the animal;

the cumulative daily duration of time between each detection of the presence of the animal and the departure of the animal;

the average, maximum and minimum rates of food and water consumption, expressed in weight of food and water consumed per unit of time;

the cumulative daily number of times the presence of the animal is detected;

the amount of time since the last time presence of the animal is detected; and the average daily time interval between instances where presence of animal is detected.

\* \* \* \* \*